US006018753A

United States Patent [19]
Kovacevic et al.

[11] Patent Number: 6,018,753
[45] Date of Patent: Jan. 25, 2000

[54] INTERPOLATING FILTER BANKS IN ARBITRARY DIMENSIONS

[75] Inventors: Jelena Kovacevic, New York, N.Y.; Wim Sweldens, New Providence, N.J.

[73] Assignee: Lucent Technologies Inc., Murray Hill, N.J.

[21] Appl. No.: 08/902,557

[22] Filed: Jul. 29, 1997

[51] Int. Cl.$^7$ .................................................. G06F 17/17
[52] U.S. Cl. ........................................................ 708/313
[58] Field of Search ....................... 364/724.011, 724.05, 364/724.1, 724.13, 725.01, 725.02; 708/300, 308, 313, 316, 400, 401

[56] References Cited

U.S. PATENT DOCUMENTS

| | | | |
|---|---|---|---|
| 4,799,179 | 1/1989 | Masson et al. ....................... | 364/724.1 |
| 5,436,940 | 7/1995 | Nguyen ..................................... | 375/240 |
| 5,568,142 | 10/1996 | Velázquez et al. ...................... | 341/126 |
| 5,745,187 | 4/1998 | Hulyalkar et al. ........................ | 348/607 |

OTHER PUBLICATIONS

I. Daubechies, "Orthonormal bases of compactly supported wavelets," Comm. Pure Appl. Math., vol. 41, pp. 909–996, 1998.

A Cohen, I. Daubechies, and J. Feauveau, "Bi–orthogonal bases of compactly supported wavelets," Comm. Pur Appl. Math., vol. 45, pp. 485–560, 1992.

M. Vetterli and C. Herley, "Wavelets and filter banks: Theory and design," IEEE Trans. Acoust. Speech Signal Process., vol. 40, No. 9, pp. 2207–2232, 1992.

J. Kovačević and M. Vetterli, "Nonseparable multidimensional perfect reconstruction filter banks and wavelet bases for $R^n$," IEEE Trans. Inform. Theory, vol. 38, No. 2, pp. 533–555, 1992.

S.D. Riemenschneider and Z. Shen, "Wavelets and pre–wavelets in low dimensions," J. Approx. Theory, vol. 71, No. 1, pp. 18–38, 1992.

A. Cohen and I. Daubechies, "Non–separable bidimensional wavelet bases," Rev. Mat. Iberoamericana, vol. 9, No. 1, pp. 51–137, 1993.

A. Cohen and J.–M. Schlenker, "Compactly supported bidimensional wavelet bases with hexagonal symmetry," Constr. Approx., vol. 9, No. 2, pp. 209–236, 1993.

W. Sweldens, "The lifting scheme: A custom–design construction of biorthogonal wavelets," Journal of Appl. and Comput. Harmonic Analysis, vol. 3, No. 2, pp. 186–200, 1996.

W. Sweldens, "The lifting scheme: A construction of second generation wavelets," <http://cm.bell–labs.com/who.wim>. 1996.

(List continued on next page.)

*Primary Examiner*—Chuong Dinh Ngo

[57] ABSTRACT

Interpolating filter banks are constructed for use with signals which may be represented as a lattice of arbitrary dimension d. The filter banks include M channels, where M is greater than or equal to two. A given filter bank is built by first computing a set of shifts $\tau_i$ as $D^{-1} t_i$, i=1,2, ... M-1, where $t_i$ is a set of coset representatives taken from a unit cell of the input signal lattice, and D is a dilation matrix having a determinant equal to M. A polynomial interpolation algorithm is then applied to determine weights for a set of M-1 predict filters $P_i$ having the shifts $\tau_i$. A corresponding set of update filters $U_i$ are then selected as $U_i = P_i^*/M$, where $P_i^*$ is the adjoint of the predict filter $P_i$. The resulting predict and update filters are arranged in a lifting structure such that each of the predict and update filters are associated with a pair of the M channels of the filter bank. The input signal applied to the filter bank is downsampled in each of the M channels, and then interpolated using the M-1 predict filters and the M-1 update filters. The downsampled and interpolated signal may be reconstructed using complementary interpolation and upsampling operations.

16 Claims, 12 Drawing Sheets

OTHER PUBLICATIONS

A.A.M.L. Bruekens and A.W.M. van den Enden, "New networks for perfect inversion and perfect reconstruction," IEEE J. Selected Areas Commun., vol. 10, No. 1, 1992.

I.A. Shah and A.A.C. Kalker, "On ladder structures and linear phase conditions for multidimensional biorthogonal filter banks," Preprint, Philips Research Laboratories, Eindhoven, Netherlands, 1994.

I. Daubechies and W. Sweldens, "Factoring wavelet and subband transforms into lifting steps," Technical Report, Bell Laboratories, Lucent Technologies, <http://cm.bell–labs.com.who/wim>, 1996.

R. Calderbank, I. Daubechies, W. Sweldens, and B.–L. Yeo, "Wavelet transforms that map integers to integers," Technical Report, Department of Mathematics, Princeton University, 1996.

W. Sweldens and R. Piessens, "Quadrature formulae and asymptotic error expansions for wavelet approximations of smooth functions," SIAM J. Numer. Anal., vol. 31, No. 4, pp. 1240–1264, 1994.

R.A. Gopinath and C.S. Burrus, "On the moments of the scaling function," in Proceedings ISCAS, pp. 963–966, IEEE, 1992.

J. Kovačević and M. Vetterli, "Nonseparable two–and three–dimensional wavelets," IEEE Trans. Signal Proc., vol. 43 pp. 1269–1273, May 1995.

I.A. Shah and A.A.C. Kalker, "Algebraic theory of multidimensional filter banks and their design," pp. 1–77, IEEE, 1992.

C. de Boor, "Polynomial interpolation in several variables," Carl de Boor, University of Wisconsin–Madison, pp. 1–24, 1992.

C. de Boor and Amos Ron, "On multivariate polynomial interpolation," University of Wisconsin–Madison, pp. 1–13, 1990.

C. de Boor and Amos Ron, "Computational aspects of polynomial interpolation in several variables," University of Wisconsin–Madison, pp. 1–24. 1990.

J. Stoer and R. Bulirsch, "Introduction to numerical analysis," New York: Springer Verlag, pp. 40–43, 1992.

INTERPOLATING FILTER BANKS IN ARBITRARY DIMENSIONS

FIELD OF THE INVENTION

The present invention relates generally to signal processing techniques, and more particularly to interpolating filter banks for use in processing signals which include samples arranged in the form of an arbitrary lattice in any number of dimensions.

BACKGROUND OF THE INVENTION

Interpolating filter banks are presently used to process sampled signals in a wide variety of applications, such as video signal processing. A signal put through an interpolating filter bank may be in the form of a multidimensional lattice of sample points. For example, in video applications, an input signal put through the filter bank may be a three-dimensional set of pixels. The interpolating filter bank generally downsamples the input signal, thereby selecting a subset of the signal sample points for further processing. The filter bank includes predict filters for providing an estimate of the sample points which were removed as a result of the downsampling. The output of the predict filters may be supplied to other signal processing hardware or software for further processing of the downsampled signal. When this further processing is complete, the filter bank interpolates and upsamples the result to provide an output with the same number of sample points as the original input signal. The interpolating filter bank thus allows a high-resolution sampled signal to be processed at a lower sample rate, and then reconstructs the result to return the processed signal to its original resolution. Such filter banks are useful in numerous digital signal processing applications.

It is generally desirable for a filter bank to provide "perfect reconstruction." That is, a filter bank configured to downsample, interpolate, and then upsample a given input signal, without any further processing of the downsampled and interpolated signal, should ideally provide perfect reconstruction of the original input signal. Filter banks designed to provide this property are described in, for example, F. Mintzer, "Filters for distortion-free two-band multirate filter banks," IEEE Trans. Acoust. Speech Signal Process., Vol. 33, pp. 626–630, 1985; M. J. T. Smith and T. P. Barnwell, "Exact reconstruction techniques for tree-structured subband coders," IEEE Trans. Acoust. Speech Signal Process., Vol.34, No. 3, pp. 434–441, 1986; P. P. Vaidyanathan, "Theory and design of M-channel maximally decimated quadrature mirror filters with arbitrary M, having perfect reconstruction property," IEEE Trans. Acoust. Speech Signal Process., Vol. 35, No. 2, pp. 476–492, 1987; and M. Vetterli, "Filter banks allowing perfect reconstruction," Signal Processing, Vol. 10, pp. 219–244, 1986.

The design of perfect reconstruction filter banks is related to the concept of "wavelets" in mathematical analysis. Wavelets have been defined as translates and dilates of a fixed function, and have been used to both analyze and represent general functions, as described in A. Grossman and J. Morlet, "Decomposition of Hardy functions into square integrable wavelets of constant shape," SIAM J. Math. Anal., Vol. 15, No. 4, pp. 723–736, 1984, and Y. Meyer, Ondelettes et Opérateurs, I: Ondelettes, II: Opérateurs de Calderón-Zygmund, III: (with R. Coifman), Opérateurs multilinéaires, Paris: Hermann, 1990, English translation of first volume, Wavelets and Operators, Cambridge University Press, 1993. In the late 1980s, the introduction of multiresolution analysis provided a connection between wavelets and the subband filters used in filter banks, as described in S. G. Mallat, "Multiresolution approximations and wavelet orthonormal bases of $L^2(R)$," Trans. Amer. Math. Soc., Vol. 315, No. 1, pp. 69–87, 1989. This led to the first construction of smooth, orthogonal, and compactly supported wavelets as described in I. Daubechies, "Orthonormal bases of compactly supported wavelets," Comm. Pure Appl. Math., Vol. 41, pp. 909–996, 1988. Many generalizations to biorthogonal or semiorthogonal wavelets followed. Biorthogonality allows the construction of symmetric wavelets and thus linear phase filters as described in A Cohen, I. Daubechies, and J. Feauveau, "Bi-orthogonal bases of compactly supported wavelets," Comm. Pure Appl. Math., Vol. 45, pp. 485–560, 1992; and M. Vetterli and C. Herley, "Wavelets and filter banks: Theory and design," IEEE Trans. Acoust. Speech Signal Process., Vol. 40, No. 9, pp. 2207–2232, 1992. For further background information on wavelets and subband filters, see, for example, I. Daubechies, "Ten Lectures on Wavelets," CBMS-NSF Regional Conf. Series in Appl. Math., Vol. 61, Philadelphia, Pa.: Society for Industrial and Applied Mathematics, 1992; M. Vetterli and J. Kovačević, "Wavelets and Subband Coding," Prentice Hall, Englewood Cliffs, N.J., 1995; and G. Strang and T. Nguyen, "Wavelets and Filter Banks," Wellesley, Cambridge, 1996.

An important unsolved problem in filter bank design is how to generalize filter banks to process signals in multiple dimensions. One possible approach is to use tensor products of available one-dimensional solutions, which generally leads to separable filters in the filter bank. However, this approach only provides symmetry around the coordinate axes and rectangular divisions of the frequency spectrum, while in many applications nonrectangular divisions are more desirable and better preserve signal content. Several other approaches, both orthogonal and biorthogonal and using different types of signal lattices, have been proposed in J. Kovačević and M. Vetterli, "Nonseparable multidimensional perfect reconstruction filter banks and wavelet bases for $R^n$," IEEE Trans. Inform. Theory, Vol. 38, No. 2, pp. 533–555, 1992; S. D. Riemenschneider and Z. Shen, "Wavelets and pre-wavelets in low dimensions," J. Approx. Theory, Vol. 71, No. 1, pp. 18–38, 1992; A. Cohen and I. Daubechies, "Non-separable bidimensional wavelet bases," Rev. Mat. Iberoamericana, Vol. 9, No. 1, pp. 51–137, 1993; and A. Cohen and J. -M. Schlenker, "Compactly supported bidimensional wavelet bases with hexagonal symmetry," Constr. Approx., Vol. 9, No. 2, pp. 209–236, 1993. However, these approaches are generally limited to dimensions of two or three, because the algebraic conditions which must be solved to determine filter characteristics become increasingly cumbersome in higher dimensions. Although systematic approaches based on the McClellan transform and cascade structures also exist, these and the other approaches noted above all fail to provide adequate techniques for designing filter banks in arbitrary dimensions.

Recently, a new approach to the study of wavelet construction was provided by the so-called "lifting scheme" as described in W. Sweldens, "The lifting scheme: A custom-design construction of biorthogonal wavelets," Journal of Appl. and Comput. Harmonic Analysis, Vol. 3, No. 2, pp. 186–200, 1996; and W. Sweldens, "The lifting scheme: A construction of second generation wavelets," <http://cm.bell-labs.com/who/wim>, both of which are incorporated by reference herein. These references show that in one-dimensional, two-channel applications, a filter bank may be designed using two lifting operations, a predict operation and an update operation, where the update filter for implementing the update operation is one half times the adjoint of the predict filter implementing the predict operation. While the original motivation for lifting was to build time-varying perfect reconstruction filter banks or so-called "second generation wavelets," lifting turned out to have several advantages for classic time-invariant wavelet construction. In the time-invariant case, lifting has many connections to earlier approaches. The basic idea behind lifting is that there is a simple relationship between all filter banks that share the same lowpass or the same highpass filter. This relationship was observed in the above-cited M. Vetterli and C. Herley reference, and is sometimes referred to as the Herley-Vetterli lemma. Also, lifting leads to a particular implementation of the filter bank. This implementation is known as a ladder structure, as described in A. A. M. L. Bruekens and A. W. M. van den Enden, "New networks for perfect inversion and perfect reconstruction," IEEE J. Selected Areas Commun., Vol. 10, No. 1, 1992. Recently, it was shown that all finite impulse response (FIR) filter banks fit into the lifting framework. See I. A. Shah and A. A. C. Kalker, "On ladder structures and linear phase conditions for multidimensional biorthogonal filter banks," Preprint, Philips Research Laboratories, Eindhoven, Netherlands, and I. Daubechies and W. Sweldens, "Factoring wavelet and subband transforms into lifting steps," Technical Report, Bell Laboratories, Lucent Technologies, <http://cm.bell-labs.com/who/wim>. Although the above-cited references indicate that the lifting approach is suitable for processing one-dimensional signals in two-channel filter banks, it has not been apparent whether or how lifting could be used for processing signals of arbitrary dimension, and in filter banks with M channels, where M is greater than two. Moreover, the above-cited references are primarily directed to techniques for breaking down an existing filter bank into the lifting framework, and thus fail to provide general techniques for designing a filter which has a desired response while also fitting within the lifting framework.

A need therefore exists for a general approach to building filter banks with any number of channels that may be used to process signals with any number of dimensions.

SUMMARY OF THE INVENTION

The present invention allows lifting techniques, heretofore considered applicable only to one-dimensional signals in two-channel filter banks, to be applied to multidimensional signals and to filter banks having M channels, where M is greater than two. An input signal to be filtered may be in the form of a lattice of sample points of dimension d. A given filter bank for filtering the input signal is built by first computing a set of shifts $\tau_i$ as $D^{-1} t_i$, i=1, 2, ... M-1, where $t_i$ is a set of coset representatives taken from a unit cell of a sublattice representing a rotated portion of the input signal lattice, and D is a dilation matrix having a determinant equal to M. A polynomial interpolation algorithm, such as the well-known de Boor-Ron algorithm, is then applied to determine weights for a set of M-1 predict filters $P_i$ having the shifts $\tau_i$. A corresponding set of M-1 update filters $U_i$ are then selected as $U_i = P_i^*/M$, where $P_i^*$ is the adjoint of the predict filter $P_i$. The resulting predict and update filters are arranged in a lifting structure such that each of the predict and update filters are associated with a pair of the M channels of the filter bank. In various embodiments of the invention, M may be greater than or equal to two, while the input signal is in the form of a lattice of sample points having dimension d greater than or equal to two. Alternatively, M may be greater than two, and the input signal may be in the form of a lattice of sample points having dimension d greater than or equal to one.

An input signal applied to the filter bank is downsampled in each of the M channels, and then interpolated using the M-1 predict filters and the M-1 update filters. The filter bank includes a number of delay elements for delaying the input signal in each of the last M-1 of the M channels, such that a delay of $t_i$ is applied to the input signal in the ith channel, for i=1, ... M-1, prior to downsampling the input signal in that channel. A downsampled and interpolated signal may be reconstructed using a second set of M-1 predict filters and a corresponding second set of M-1 update filters, where each of the predict and update filters in the second sets have the same weights as those in the first sets, and are also associated with a pair of the M channels of the filter bank. An upsampler in each of the M channels upsamples portions of the signal in each of the M channels, after processing in the second sets of predict and update filters, and a signal combiner recombines outputs of the M channels to generate an output signal having substantially the same resolution as the input signal.

The invention provides a general lifting-based technique for building filter banks that works in any dimension, for any type of signal lattice and any number of primal and dual vanishing moments. The invention provides the advantages commonly associated with other lifting-based techniques, such as custom design, in-place computation and integer-to-integer transforms, as well as computation speed, which is particularly important in multidimensional applications. The techniques of the present invention may be implemented in hardware, software or combinations thereof, and may be used in video signal processing as well as other any digital signal processing application in which signals are processed by filter banks. These and other features and advantages of the present invention will become more apparent from the accompanying drawings and the following detailed description.

DETAILED DESCRIPTION OF THE INVENTION

Figure 1:
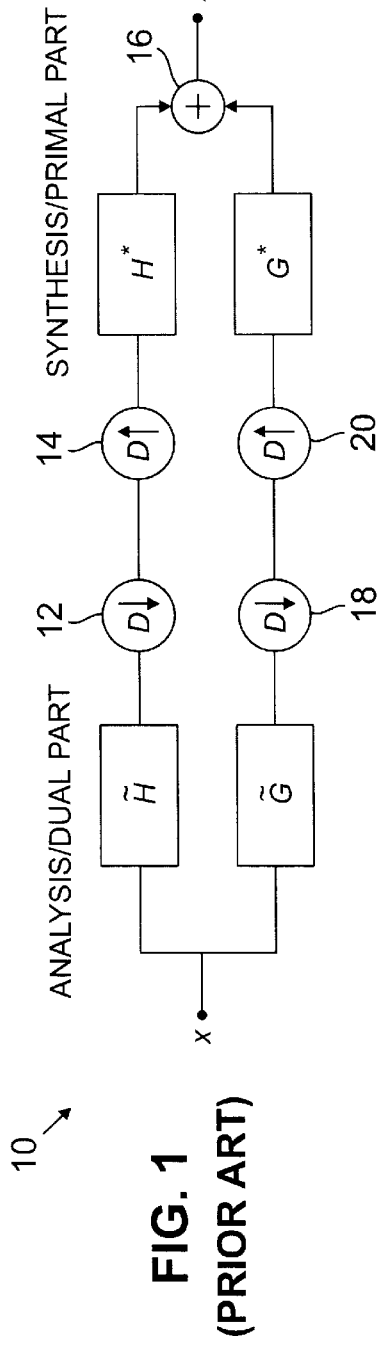
FIG. 1 is a block diagram of a conventional two-channel analysis/synthesis filter bank.

The present invention will be illustrated below in conjunction with exemplary filter banks and signal lattices. It should be understood, however, that the disclosed techniques are suitable for use with a wide variety of other types of signals and in numerous diverse signal processing applications. The term "filter bank" as used herein refers generally to a device for processing a set of samples of a signal. A "lattice" is a representation of signal sample points in one or more dimensions. A "sublattice" is a subset of the sample points of a lattice, and is generally shown in the sampled domain, that is, without other signal sample points which are removed as a result of a downsampling operation. The sublattice typically represents a rotated portion of its corresponding signal lattice. A sublattice is used to identify a particular "neighborhood," where a neighborhood refers generally to a local subset of sample points in the corresponding sublattice, which is located around a point to be interpolated in a filter bank. A neighborhood is also referred to herein as a "ring."

The present invention provides general techniques for constructing filter banks which may be used to process signals with any number of dimensions, any lattice representation and any number of primal and dual vanishing moments. The invention provides a generalization to multiple dimensions and multiple channels of the one-dimensional, two-channel lifting technique described in the above-cited W. Sweldens references. As will be described in greater detail below, the invention allows lifting techniques with nonseparable filters to be applied with multidimensional signals and in M-channel applications. More particularly, it will be shown that filter banks constructed in accordance with the invention may be used to process signals in multiple dimensions and M channels, and that a given update filter may be selected as the adjoint of the corresponding predict filter divided by M. The predict filter can be constructed using, for example, a polynomial interpolation algorithm such as the de Boor-Ron algorithm for multivariate polynomial interpolation. The invention provides the advantages commonly associated with other lifting-based techniques, such as custom design, in-place computation and integer-to-integer transforms, as described in more detail in R. Calderbank, I. Daubechies, W. Sweldens, and B. -L. Yeo, "Wavelet transforms that map integers to integers," Technical Report, Department of Mathematics, Princeton University, 1996, and speed, which is particularly important in multidimensional applications and is described for the one-dimensional case in I. Daubechies and W. Sweldens, "Factoring wavelet and subband transforms into lifting steps," Technical Report, Bell Laboratories, Lucent Technologies, <http://cm.bell-labs.com/who/wim>.

The notation used herein to describe the invention will now be summarized. A signal x is a sequence of real-valued numbers indexed by the index K:

$$x = \{x_k \in R | k \in K\} \in R^K.$$

In general, K can be either a finite set or an infinite set. The following description will focus on signals defined on a lattice in a d-dimensional Euclidean space such that $K = Z^d$. A sequence is said to be finite if only a finite number of the $x_k$ are nonzero. A sequence x is of finite energy, $x \in l^2 = l^2(Z^d)$, if $$\|x\|^2 = \sum_k x_k^2 < \infty$$

The inner product <x, y> of a pair of sequences x and y of finite energy $l^2$ is defined as:

$$\langle x, y \rangle = \sum_k x_k y_k = x^* y \qquad (1)$$

Linear operators A: $l^2 \to l^2$ are often used. The adjoint or transpose A* of a linear operator A is defined such that $$\langle Ax, y \rangle = \langle x, A^* y \rangle \text{ for } x, y \in l^2$$

Let $\pi(x)$ be a multivariate polynomial, with $x \in R^d$. The notation $\pi(Z^d)$ or simply $\pi$ will denote the sequence formed by evaluating the polynomial $\pi(x)$ on the lattice $Z^d$:

$$\pi = \pi(Z^d) = \{\pi(k) | k \in Z^d\}$$

$\pi_n$ will denote the space of all polynomial sequences of total degree strictly less than n.

The notation for one-dimensional filters will now be described. A linear operator A which is time invariant will be referred to herein as a filter. Its action is then simply convolution with the impulse response sequence $\{a_k | k \in K\}$, $$(Ax)_l = (a * x)_l = \sum_k a_{l-k} x_k.$$

The following description will assume that the impulse response is finite, i.e., A is a finite impulse response (FIR) filter. This implies that the action of a filter on a polynomial sequence is well defined. The Fourier series of the impulse response sequence is $$A(e^{i\omega}) = \sum_k a_k e^{-i\omega k}.$$

The z-transform of the impulse response is then the Laurent polynomial, with $z = e^{iw}$:

$$A(z) = \sum_k a_k z^{-k}.$$

It should be noted that capital letters are used herein to denote operators as well as the Fourier transform of sequences. The meaning will be clear from the context.

Filters described herein may be characterized as using differentiation with respect to ω. To simplify the notation, it is convenient to define a scaled version of the differentiation operator as $$\nabla = \frac{d}{id\omega}$$

This symbol is also used with the z notation. It is important to keep in mind that the differentiation is with respect to ω and that z is simply a place holder for $e^{i\omega}$. For example, $z^\alpha$ is simply $e^{i\alpha\omega}$ and there is no ambiguity even if $\alpha$ is non-integer. This leads to the following:

$$\nabla z^\alpha = \alpha z^\alpha \text{ for } \alpha \in R.$$

In addition, $$\nabla^n A(z) = A^{(n)}(z) = \sum_k a_{-k} k^n z^k.$$

Consequently, $$\nabla^n A(z^\alpha) = \alpha^{(n)} A^{(n)}(z^\alpha).$$

In the case of multidimensional filters, where $K=Z^d$, the description given above for the one-dimensional case is modified to utilize a so-called multi-index notation in which an index $k \in Z^d$ represents a vector $(k_1, \ldots, k_d)$ where $k_j \in Z$. Similarly, z represents a vector $(z_1, \ldots, z_d)$, n a vector $(n_1, \ldots, n_d)$, and $\alpha$ a vector $(\alpha_1, \ldots, \alpha_d)$. Now $k^n$ should be understood as $$k^n = \prod_{j=1}^d k_j^{n_j},$$

and similarly $z^\alpha$ is $$z^\alpha = \prod_{j=1}^d z_j^{\alpha_j}. \tag{2}$$

The differentiation operator $\nabla$ is now given by $$\nabla = \left( \frac{\partial}{i \partial \omega_1}, \ldots, \frac{\partial}{i \partial \omega_d} \right).$$

Similarly, $$\nabla^n = \left( \frac{\partial^{n_1}}{i^{n_1} \partial \omega_1^{n_1}}, \ldots, \frac{\partial^{n_d}}{i^{n_d} \partial \omega_d^{n_d}} \right).$$

Given the above, it is still true, as in the one-dimensional case, that $$\nabla^n A(z) = A^{(n)}(z) = \sum_k a_{-k} k^n z^k, \tag{3}$$

as well as that $$\nabla^n A(z^\alpha) = \alpha^n A^{(n)}(z^\alpha). \tag{4}$$

Note that the above equation is a vector equation. The following description will also use 1 to denote a vector $(1, \ldots, 1) \in Z^d$. The size of a multi-index is defined as $$|k| = \sum_{j=1}^d k_j,$$

so that the degree of the monomial $$x^n = x_1^{n_1} \ldots x_d^{n_d}$$

is $|n|$.

The notation for lattices and sublattices will now be described. If D is a d×d matrix with integer coefficients, a sublattice of $K=Z^d$ may be found as $DZ^d$. As noted above, a sublattice is a representation in the sampled domain of a subset of the sample points in a lattice. The determinant of D is an integer denoted by M, where $|D|=M \in Z$. Then there are (M-1) distinct cosets each of the form $DZ^d+t_j$ with $t_j \in Z^d$ and $1 < j < M-1$. $Z^d$ may be written as $$Z^d = \bigcup_{j=0}^{M-1} (DZ^d + t_j),$$

where $t_o=0$ and the union is disjoint. The choice of the $t_j$ can be made unique by choosing $D^{-1} t_j$ to be in the unit hypercube $[0, 1]^d$. Given a lattice $L=DZ^d+t$, a polynomial on this lattice can be sampled as $$\pi(L) = \{\pi(Dk+t) | k \in Z^d\}$$

Note that $$\pi(L) \in R^{Z^d},$$

and it is thus a sequence indexed by $Z^d$ and not by L.

Since the following description will be dealing with upsampling in multiple dimensions, $z^D$ is defined where z is a complex vector and D is a matrix. Thus $$z^D = \{z^{d_1}, z^{d_2}, \ldots z^{d_d}\}, \tag{5}$$

where $d_i$ is the ith column vector of matrix D and $z^{d_i}$ is as defined in Equation (2).

In some applications, data may be sampled on a more general lattice $K=\Gamma Z^d$, where $\Gamma$ is an invertible d×d matrix. A typical example is a two-dimensional triangular lattice where $$\Gamma_{triang} = \begin{bmatrix} 1 & 1/2 \\ 0 & \sqrt{3}/2 \end{bmatrix}.$$

One can now find sublattices by simply premultiplying D×$\Gamma$. Given that the illustrative filter construction of the invention relies on polynomial interpolation and that polynomial spaces of fixed degree are invariant under affine transforms, it may be assumed without loss of generality that $\Gamma$ is the identity matrix. $\Gamma$ can play a role in choosing neighborhoods for interpolants, as will be described in more detail below.

A multidimensional filter is defined herein as an interpolating filter when $h_{Dk}=\delta_k$. Taking the z-transform of $h_k$ and summing it along all the cosets, the only term left on the original lattice is 1, since all others are zero by definition. Then, in the two-channel case the above definition is equivalent to $$H(z) = 1 + z^{t_1} P(z^D), \text{ or } H(z) + H(-z) = 2.$$

These filters are also called halfband filters. In the M-channel case, an interpolating filter can be written as $$H(z) = 1 + \sum_{i=1}^{M-1} z^{t_i} P_i(z^D),$$

and these filters are called Mth-band filters. The filters H and $\tilde{H}$ are biorthogonal in the case that $H(z) \tilde{H}(1/z)$ is interpolating.

In the following, a particular class of filters is introduced which may be used to construct filter banks in accordance with the invention. These filters are closely related to polynomial interpolation, and are therefore referred to herein as Neville filters. See, for example, the description of the Neville algorithm in J. Stoer and R. Bulirsch, "Introduction to Numerical Analysis," New York: Springer Verlag, 1980. It will be shown how Neville filters are related to other existing filter families such as Coiflets as well as Lagrangian halfband or Deslauriers-Dubuc filters. Moreover, filters from filter families other than those noted may be used in place of or in conjunction with Neville filters in interpolating filter banks in accordance with the invention.

A Neville filter applied to a polynomial of a certain degree sampled on a lattice results in that same polynomial, but now sampled on a lattice which is offset by $\tau$ with respect to the original lattice. This leads to the following definition. A filter P is a Neville filter of order N with shift $\tau \in R^d$ if $$P\pi(Z^d) = \pi(Z^d + \tau) \text{ for } \pi \in \pi_N \quad (6)$$

An important thing to note is that $\tau$ need not be an integer vector. The Neville condition of a filter can be related back to its impulse response $\{p_k\}$. Writing out Equation (6) for a monomial $x^n$ yields $$\sum_k P_{-k}(1+k)^n = (1+\tau)^n \text{ for } |n| < N.$$

Given that polynomial spaces are shift invariant it is sufficient to impose the following condition for l=0:

$$\sum_k P_{-k} k^n = \tau^n \text{ for } |n| < N, \quad (7)$$

where the left-hand side according to Equation (3) is equal to $P^{(n)}(1)$. It then follows that a filter P is a Neville filter of order N with shift $\tau$ if and only if its impulse response satisfies:

$$\sum_k P_{-k} k^n = P^{(n)}(1) = \tau^n \text{ for } |n| < N.$$

It can then be shown that the adjoint of a Neville filter, that is, the filter obtained by time-reversing its impulse response, is also a Neville filter. In other words, if a filter P is a Neville filter of order N with shift $\tau$, then P* is a Neville filter of order N with shift $-\tau$. It can also be shown that if P is a Neville filter of order N with shift $\tau$, and P' is a Neville filter of order N' with shift $\tau'$ then PP' is a Neville filter of order min(N, N') and shift $\tau+\tau'$. This shows that Neville filters of a fixed order form a group. Finally, If P is a Neville filter of order N with shift $\tau$, then Q, where $Q(z)=P(z^D)$, is a Neville filter of order N with shift $D\tau$.

Building Neville filters in d dimensions with a certain prescribed order N and shift $\tau$ involves polynomial interpolation. There are $$q = \binom{N+d-1}{d} \quad (8)$$

equations like (7) to satisfy, so one would expect to need f=q filter taps to construct the Neville filter. Given that $\tau$ is in the above-defined unit hypercube, the f filter taps should be located around the unit hypercube in a symmetric neighborhood. Finding the Neville filters is then equivalent to solving a q×q linear system. In the one-dimensional case, this system has a Vandermonde matrix and is always invertible. A very easy and fast method to find the solution is the Neville algorithm, described in the above-cited J. Stoer and R. Bulirsch reference. In the multidimensional setting, the situation becomes much more complicated and the linear system is not necessarily solvable. It can be either overdetermined or underdetermined, so to achieve order N one may need either more than q or less than q filter taps. For example, three points in $R^2$ in general define a linear polynomial, unless they lie on a line, in which case they define a quadratic polynomial. Thus the degree of interpolation does not only depend on the number of interpolation points but also on the arrangement of the points. It is not clear a priori how many interpolation points one needs to obtain a certain degree. However, a solution may be obtained using a technique described in C. de Boor and A. Ron, "Computational aspects of polynomial interpolation in several variables," Math. Comp., Vol. 58, pp. 705–727, 1992 and C. de Boor and A. Ron, "On multivariate polynomial interpolation," Constr. Approx., Vol. 6, pp. 287–302, 1990, both of which are incorporated by reference herein. This technique involves first fixing a point configuration of f points in $R^d$ and then finding the correct polynomial space and order N to define interpolation, and provides an algorithm to compute the interpolant. The present invention will make use of this de Boor-Ron algorithm to compute Neville filters. The computation will first fix a neighborhood around $\tau$ and then compute the order N. If the order is insufficient, the neighborhood will be enlarged.

It should be noted that a number of well-known filters may be characterized as Neville filters. For example, the identity filter, where the impulse response is a Kronecker delta pulse, is a Neville filter of order infinity with shift 0. Similarly, an impulse response $z^k$ with $k \in Z^d$ is a Neville filter of order infinity with shift k. This illustrates that a Neville filter with any desired shift can be constructed by multiplying a Neville filter with a shift in the unit hypercube by the appropriate power of z. In addition, the Deslauriers-Dubuc interpolating subdivision technique uses filters which can predict the values of a polynomial at the half integers given the polynomial at the integers, as described in G. Deslauriers and S. Dubuc, "Interpolation dyadique," in "Fractals, dimensions non entières et applications," pp. 44–55, Paris: Masson, 1987. These filters are thus Neville filters with shift ½. Lagrangian halfband filters, as described in P. Vaidyanathan, "Multirate Systems and Filter Banks," Englewood Cliffs, N.J.: Prentice Hall, 1992, are interpolating filters with a prescribed number of zeros at −1. Because H(z)=1−H(−z), the filter has the same order of flatness at 0. Their odd polyphase component coincides with a Deslauriers-Dubuc filter. It can be shown that if $H(z)=1+z^{-1}P(z^2)$ and P is a Neville filter of shift ½ then H is a Neville filter of the same order and shift 0. It thus is a Lagrangian halfband filter.

It is also known that the lowpass orthogonal Daubechies filters, as described in I. Daubechies, "Orthonormal bases of compactly supported wavelets," Comm. Pur Appl. Math., Vol. 41, pp. 909–996, 1988, of order 2 or more satisfy $H^{(2)}(1)=(H^{(1)}(1))^2$. See also W. Sweldens and R. Piessens, "Quadrature formulae and asymptotic error expansions for wavelet approximations of smooth functions," SIAM J. Numer. Anal., Vol. 31, No. 4, pp. 1240–1264, 1994; and R. A. Gopinath and C. S. Burrus, "On the moments of the scaling function," in Proceedings ISCAS, pp. 963–966, IEEE, 1992. In fact, this is true for any orthogonal lowpass filters having an order of at least 2. Consequently, these filters are Neville filters of order 3 with a shift corresponding to their first moment $H^{(1)}(1)$. As another example, Coiflets are filters H with zero moments up to N, excluding the zeroth moment which is one, $H^{(n)}(1)=\delta_n$ for n<N. They are thus Neville filters with shift zero. Consequently polynomials of degree less than N are eigenfunctions of Coiflets. It can be shown that the autocorrelation of any Neville filter is a Coiflet of the same order. Neville filters are also closely related to the one-point quadrature formula from the above-cited W. Sweldens and R. Piessens reference. Basically, if a Neville filter has order N then the one-point quadrature formula for the corresponding scaling function has degree of accuracy N+1. The ideal Neville filter with shift τ and order infinity is the allpass filter $z^\tau$. However, it is not an FIR filter unless τ is an integer vector. One has to be extremely careful in applying such a filter to a polynomial sequence as the summation only converges conditionally. These filters are thus of limited practical use but can be thought of as the limiting case for FIR Neville filters with fixed τ as N goes to infinity.

FIG. 1 shows a d-dimensional two-channel analysis/synthesis filter bank 10 in accordance with the prior art. The filter bank 10 includes a lowpass analysis filter H̃, a highpass analysis filter G̃, a lowpass synthesis filter H* and a highpass synthesis filter G*. An input signal x is applied to the analysis filters H̃ and G̃ as shown. The output of the lowpass analysis filter H̃ is downsampled in a downsampler 12, upsampled in an upsampler 14, and applied to the lowpass synthesis filter G*. The output of G* is applied to one input of a signal combiner 16. The output of the highpass analysis filter G̃ is downsampled in a downsampler 18, upsampled in an upsampler 20, and applied to the highpass synthesis filter H*. The output of H* is applied to the other input of the signal combiner 16. The output of the combiner 16 is a reconstructed input signal x. The filter bank 10 may thus be used to downsample the input signal x for further processing at a lower signal frequency in other signal processing elements not shown in FIG. 1, and then to upsample the result of the further processing to provide an output at the original input signal frequency. The filter bank 10 makes use of the following operators:

$$H̃=(\downarrow D)H, \quad G̃=(\downarrow D)G.$$

where ↑ denotes downsampling. Similar operations are defined for duals H* and G* of H and G, respectively, such that H*=H*(↑D) and G*=G*(↑D), where ↑ denotes upsampling. Ideally, the filter bank 10 should provide perfect reconstruction, such that analysis followed by synthesis gives the identity $$H^*H̃+G^*G̃=1, \qquad (9)$$

and synthesis followed by analysis is the identity as well, or $$H̃H^*=1, \, H̃G^*=0, \, G̃H^*=0, \, G̃G^*=1.$$

This implies that $H^*H̃$ is a projection operator and the filter bank 10 thus provides splitting in complementary subspaces.

The interaction of filter bank 10 with a polynomial sequence will now be described. Note that since all of the filters have been assumed to be FIR filters, they may be permitted to operate on polynomial sequences. This will lead to the definition of two important characteristics of a filter bank, the number N of primal vanishing moments and the number N of dual vanishing moments. These correspond to the degree of polynomials which are filtered out by the highpass filters in filter bank 10. A filter bank has N primal and N dual vanishing moments if $$G̃\pi=0 \text{ for } \pi \in \pi_N, \text{ and } G\pi=0 \text{ for } \pi \in \pi_N.$$

Using perfect reconstruction, the above implies that $H^*H̃\pi=\pi$. If the highpass filter filters out certain polynomials, these polynomials are preserved only in the lowpass branch of the filter bank. Similarly, the primal moment condition implies that $\pi^*H^*H̃=\pi^*$. The number of primal vanishing moments concerns the degree of the moments of an input sequence that are preserved by the lowpass branch, or equivalently the number of zero moments of elements in the highpass branch. As expected, the mean or DC component of the signal appears only in the lowpass branch. In summary, it is desirable for a filter bank such as that shown in FIG. 1 to exhibit the properties of perfect reconstruction (PR) as given in Equation (9), dual vanishing moments (DM) as given in Equation (10), and primal vanishing moments (PM) as given in Equation (10). The lifting techniques of the present invention may be used to generate filters which exhibit these properties for input signals in arbitrary dimensions, and for filter banks with two or more channels.

As noted above, several methods have been proposed in the prior art to build filter banks that exhibit the PR, DM and PM properties. Typically, these prior art techniques attempt to satisfy all three conditions at once, which leads to cumbersome algebraic conditions, particularly in high dimensions. An important attribute of the lifting techniques of the present invention is that they permit each of the properties to be satisfied separately. First, every filter bank constructed using lifting automatically has PR, so this property need not be further addressed. In accordance with the invention, a filter bank may be constructed by starting with a trivial filter bank and then using lifting steps to enhance its properties. An embodiment of the invention to be described below uses only two lifting steps. The first one, referred to as "predict," provides the above-noted DM property, while the second, referred to as "update," provides the PM property. It will be shown how each of these two lifting steps can be designed separately.

Figure 2:
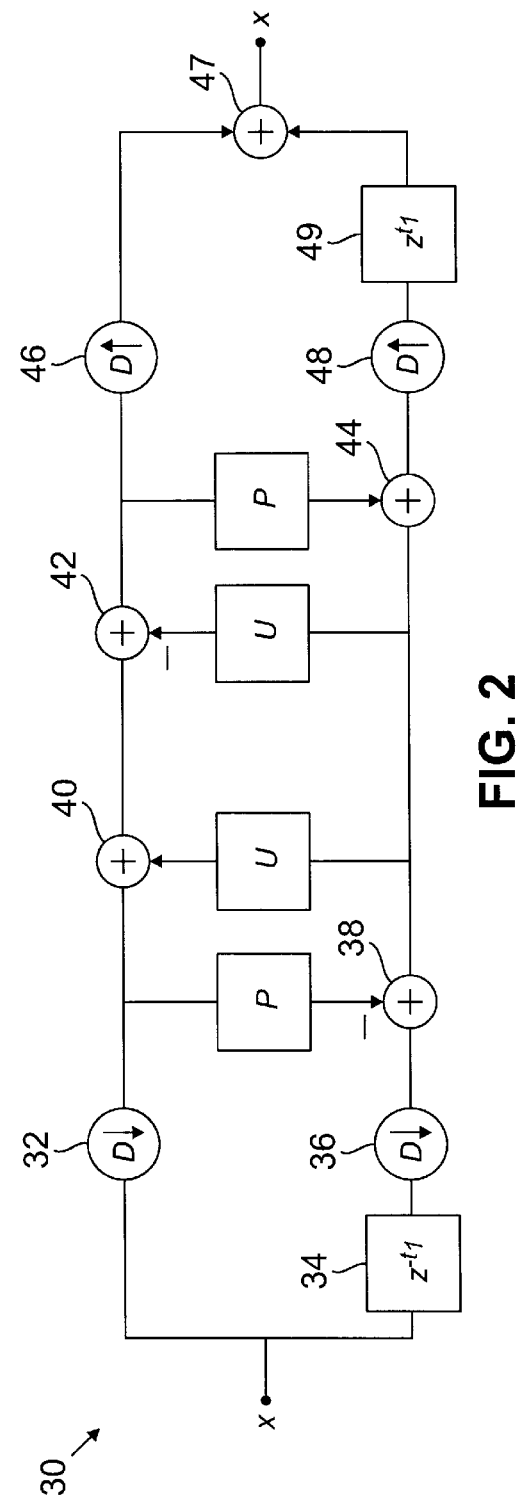
FIG. 2 is a block diagram of a two-channel filter bank for processing multidimensional signals in accordance with the invention.

FIG. 2 shows an exemplary filter bank 30 for processing multidimensional signals in accordance with the invention. The filter bank 30 receives an input signal x and initially implements a filter in the form of a polyphase transform which splits the signal into "even" and "odd" samples in accordance with a dilation matrix D. The even samples are applied to a downsampler 32, while the odd samples are applied via delay element 34 to a downsampler 36. The downsampled even samples pass through a predict filter P and the result is subtracted from the downsampled odd samples in signal combiner 38. The output of the signal combiner 38 passes through an update filter U, and the result is summed with the downsampled even samples in a signal combiner 40. Complementary operations for reconstructing the original signal x also make use of update filter U and predict filter P, in conjunction with signal combiners 42, 44 and 47, upsamplers 46, 48 and inverse delay element 49.

As previously noted, the filter bank 30 automatically provides the PR property for a given input signal. The filter bank 30, which is not time invariant due to the presence of downsampling, becomes time invariant in the polyphase domain. In the first lifting step, the predict filter P is used to predict the odd samples from the even ones. The even samples remain unchanged, while the result of the predict operation applied to the even samples in filter P is subtracted from the odd samples in signal combiner 38 to yield the highpass or wavelet coefficients. The predict filter P should be designed such that if the input sequence is a polynomial sequence, then the prediction of the odd samples is exact, the highpass coefficients are zero, and the DM property is satisfied. In the second lifting step, the update filter U is used to update the even samples based on the previously-computed highpass or wavelet coefficients. The update filter U is therefore designed to satisfy the PM property. The polyphase matrix M can be identified from FIG. 2 as being of the form:

$$M = \begin{bmatrix} H_e & H_o \\ G_e & G_o \end{bmatrix} = \begin{bmatrix} 1 & U \\ 0 & 1 \end{bmatrix} \begin{bmatrix} 1 & 0 \\ -P & 1 \end{bmatrix} = \begin{bmatrix} 1-UP & U \\ -P & 1 \end{bmatrix}. \qquad (11)$$

The inverse adjoint polyphase matrix is $$M^{*-1} = \begin{bmatrix} \tilde{H}_e & \tilde{H}_o \\ \tilde{G}_e & \tilde{G}_o \end{bmatrix} = \begin{bmatrix} 1 & P^* \\ -U^* & 1-U^*P^* \end{bmatrix}. \qquad (12)$$

From the polyphase decomposition, the filter H may be found as $$H(z) = H_e(z^D) + z^{t_1} H_o(z^D).$$

It then follows that H is interpolating since $H_e(z)=1$. The DM condition now becomes $$\tilde{G}\pi(Z^d) = \tilde{G}_e\pi(DZ^d) + \tilde{G}_o\pi(DZ^d+t) = 0.$$

Substituting values from the polyphase matrix of Equation (11) yields:

$$P\pi(DZ^d) = \pi(DZ^d+t).$$

Given that this has to hold for all $\pi \in \pi_{\tilde{N}}$ and that this space is invariant under D, this is equivalent to $$P\pi(Z^d) = \pi(Z^d+D^{-1}t), \text{ for all } \pi \in \pi_{\tilde{N}}. \qquad (13)$$

It can therefore be seen that to satisfy DM, the predict filter P has to be a Neville filter of order $\tilde{N}$ and shift $\tau = D^{-1}t$. Similarly, from Equation (12) the PM condition becomes $$G\pi(Z^d) = G_e\pi(DZ^d) + G_o\pi(DZ^d+t) = -U^*\pi(DZ^d) + (1-U^*P^*)\pi(DZ^d+t) = 0$$

for $\pi \in \pi_N$. From the foregoing it is known that P is a Neville filter of order $\tilde{N}$ and shift $\tau$. Therefore if $N \leq \tilde{N}$, the PM condition is equivalent to $$-U^*\pi(DZ^d) + \pi(DZ^d+t) - U^*\pi(DZ^d) = 0$$

or $$2U^*\pi(DZ^d) = \pi(DZ^d+t).$$

Thus 2U has to be a Neville filter of order N with shift $-\tau = -D^{-1}t$. The filter U may be selected as ½ times the adjoint of a predict filter with order N. More generally, if $P^m$ is a family of Neville filters of order m and shift $\tau = D^{-1}t$ and if $N \leq \tilde{N}$, one can construct a filter bank of the type shown in FIG. 2 with N primal vanishing moments and $\tilde{N}$ dual vanishing moments by letting the predict filter be $P^{\tilde{N}}$ and choosing the update filter as $U = P^{N*}/2$. Of course, one does not have to choose U as $P^{N*}/2$, because any other Neville filter of order N and shift $-\tau$ would suffice. However, $P^{N*}/2$ is a particularly good choice because it allows a single family of Neville filters to be used to build any $(N, \tilde{N})$ filter bank with $N \leq \tilde{N}$. Moreover, the restriction $N \leq \tilde{N}$ is appropriate in many applications. For example, in image compression applications it has been shown that the number of dual moments is generally more important than the number of primal moments. The dual moments provide polynomial cancellation as well as the smoothness of the synthesis or primal functions. If a particular application required an embodiment in which $N > \tilde{N}$, this can be achieved by exchanging the role of the primal and dual filters. In such an embodiment, the analysis lowpass filter is interpolating and the analysis or dual functions are smooth. Other alternative embodiments of the invention may utilize polynomial extrapolation instead of interpolation, in order to build both causal and anticausal Neville filters. By letting the predict P be a causal Neville filter, and the update U the adjoint of an anticausal Neville filter, it is possible to build a filter bank with only causal lifting steps.

Figure 3:
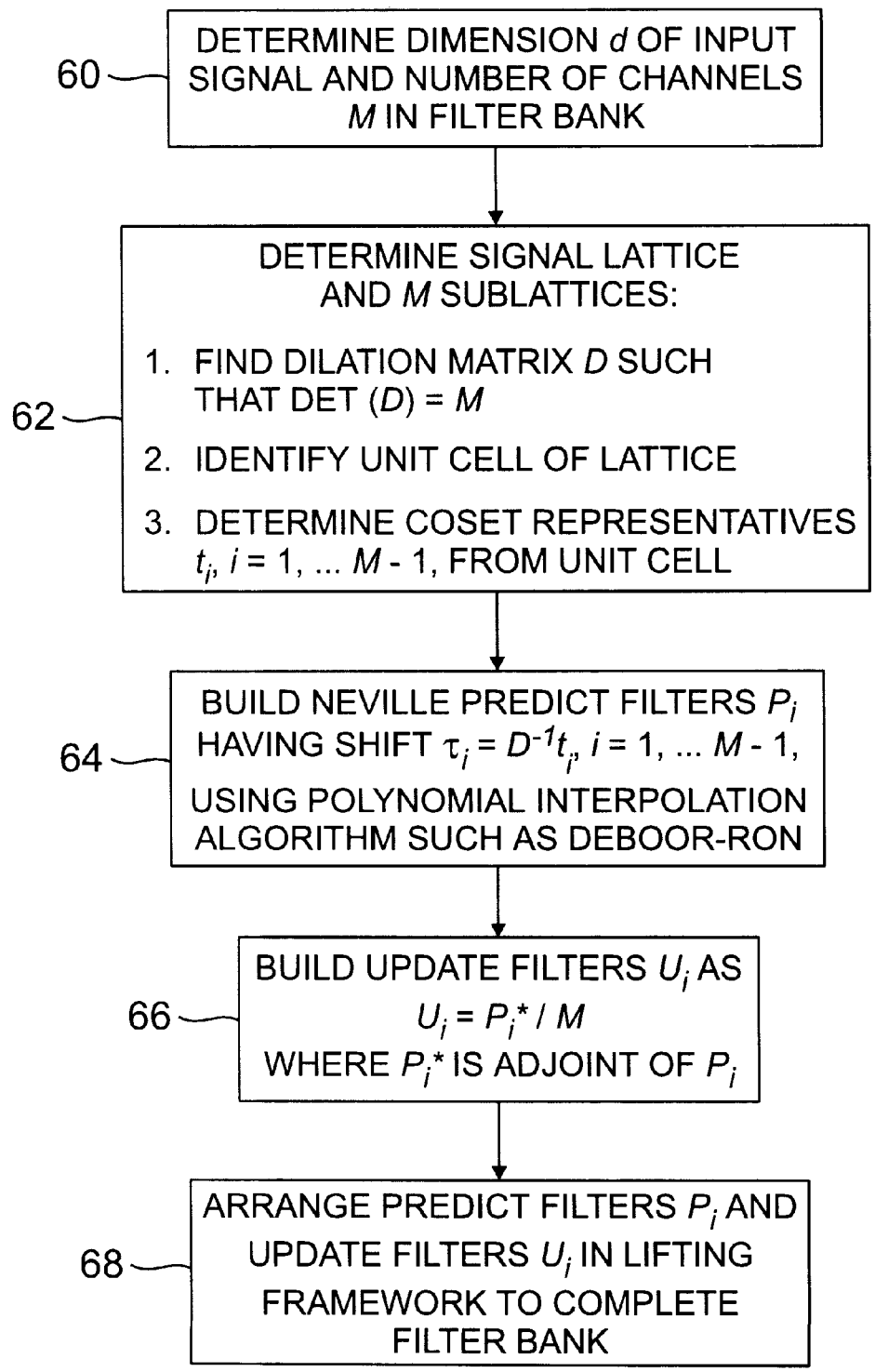
FIG. 3 is a flow diagram of a filter bank design process in accordance with the invention.

FIG. 3 is a flow diagram illustrating the process steps involved in designing interpolating filter banks in accordance with the present invention. In step 60, the dimension d of the signal to be processed and the number of channels M in the filter bank are determined. These values will vary depending upon the particular application of the filter bank. A d-dimensional signal lattice of sample points, and one or more sublattices, are then determined, as shown in step 62. This process involves finding a dilation matrix D such that the determinant of D is equal to M. A unit cell of the signal lattice is identified, and coset representatives $t_i$, $i=1, 2, \ldots$ M-1, are taken from the unit cell. In step 64, a set of shifts $\tau_i$ are generated as $\tau_i = D^{-1} t_i$, $i=1, 2, \ldots$ M-1, using a polynomial interpolation algorithm such as the above-described de Boor-Ron algorithm. The algorithm provides a suitable set of weights for M-1 Neville predict filters $P_i$ having the shifts $\tau_i$. In step 66, the update filters $U_i$ are then computed as $U_i = P_i^*/M$, where $P_i^*$ is the adjoint of the predict filter $P_i$. The predict filters $P_i$ and update filters $U_i$ are then arranged in a lifting framework, as shown in step 68. The lifting framework was described above in conjunction with FIG. 2 for M=2 and will be described below in conjunction with FIG. 7 for M>2.

Figure 4A:
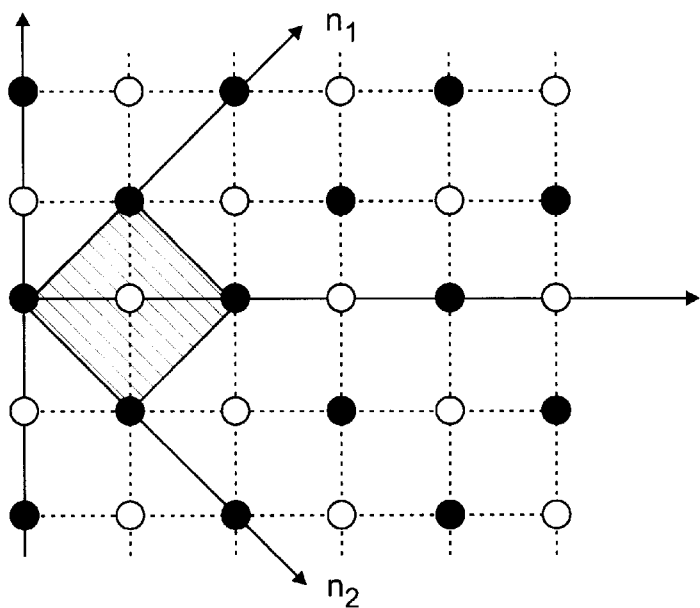
FIGS. 4A and 4B show a two-dimensional quincunx lattice with a unit cell, and a sublattice in the sampled domain, respectively.
Figure 4B:
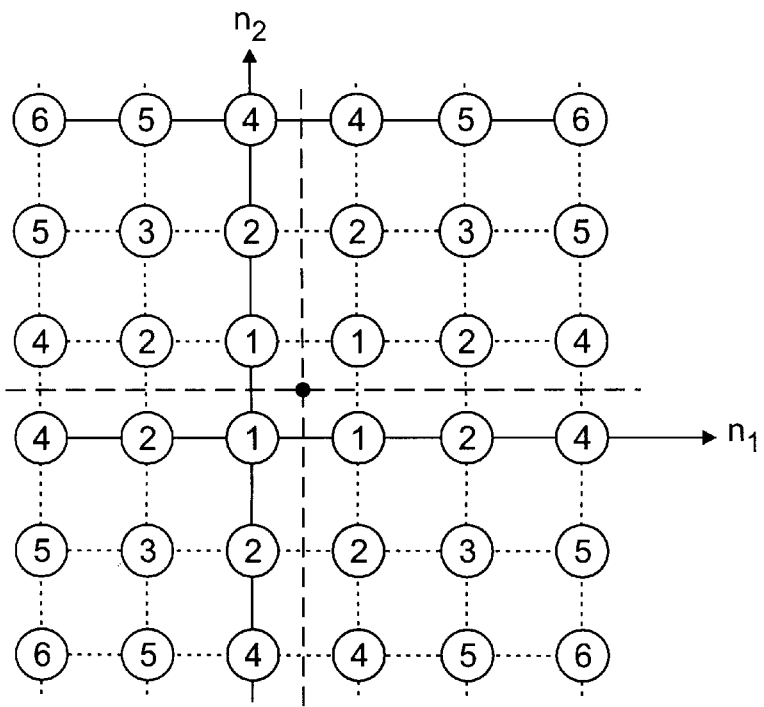

As noted above, the present invention allows a lifting technique using nonseparable filters, such as the lifting technique illustrated in FIG. 2 and previously applied only to one-dimensional signals in two-channel filter banks, to be applied to multidimensional signals and to filter banks having M channels, where M is greater than two. The invention will now be illustrated for applications in which two-channel lifting filter banks, such as filter bank 30 of FIG. 2, are constructed for filtering d-dimensional signals, where d is greater than one. FIG. 4A shows a signal lattice, referred to as the quincunx lattice, which is a two-dimensional nonseparable lattice. One of the possible dilation matrices D representing the quincunx lattice in a two-channel filter bank is given by:

$$D = \begin{bmatrix} 1 & 1 \\ 1 & -1 \end{bmatrix},$$

which is also called the "symmetry" matrix. The coset representative in this example is $t_1 = (1, 0)$. In the lattice diagram of FIG. 4A and other lattice diagrams to be described herein, the solid circles represent sample points to be processed in the filter bank, while the open circles represent sample points which will be dropped as a result of downsampling. The shaded region of the lattice diagram corresponds to the unit cell of a sublattice of the quincunx lattice of FIG. 4A, and the axes $n_i$, i=1, 2 . . . d, are the axes of the unit cell. FIG. 4B shows the sublattice of the quincunx lattice in the sampled domain, with different neighborhoods or "rings" of selected sample points designated by common numbers in the open circles. Each circle in FIG. 4B represents one of the solid circles of FIG. 4A. The small black dot in the first ring of the lattice of FIG. 4B corresponds to an exemplary point (½, −½) which is to be interpolated by a filter bank. This point represents the open circle in the center of the unit cell of FIG. 4A and thus a sample point which was dropped as a result of downsampling. In accordance with the description given above, the shift for the Neville predict filter P in the filter bank is $\tau = D^{-1} t = (½, −½)$. A number of the different-sized symmetric neighborhoods around $\tau$ in FIG. 4B are selected, and the above-noted de Boor-Ron algorithm is used to compute the corresponding order and weights for the Neville predict filter P. The results of these computations are given in TABLE 1 below. Each of the weights includes a numerator and a denominator as shown.

TABLE 1

Neville Filters for the Quincunx Lattice with d = 2 and M = 2.

| | | Numerator | | | | | De- |
|---|---|---|---|---|---|---|---|
| | | Neighborhood (Number of Points) | | | | | nomin- |
| Taps | Order | 1 (4) | 2 (8) | 3 (4) | 4 (8) | 5 (8) | 6 (4) | ator |
| 4 | 2 | 1 | | | | | | $2^2$ |
| 12 | 4 | 10 | −1 | | | | | $2^5$ |
| 16 | 6 | 81 | −18 | 2 | | | | $2^9$ |
| 32 | 8 | 1404 | −231 | 34 | 27 | −3 | | $2^{12}$ |
| 36 | 10 | 22500 | −3750 | 625 | 550 | −75 | 9 | $2^{16}$ |

The number in the second row of TABLE 1 identifies a particular neighborhood in FIG. 4B. The numbers in parentheses after the neighborhood number in the second row of TABLE 1 give the number of points in the corresponding ring, as is apparent from FIG. 4B. The "taps" column specifies the number of taps in the Neville filter P and the "order" column specifies the interpolation order in the de Boor-Ron algorithm.

Using the results of the computations in TABLE 1, an exemplary filter bank may be constructed with $\tilde{N}=4$ and $N=2$. According to the above description, $$P(z_1, z_2) = P^4(z_1, z_2) = 5/2^4(1+z_1^{-1}+z_2^{-1}+z_1^{-1}z_2^{-1}) - 1/2^5(z_1^{-2}+z_2^{-2}+z_1^{-2}z_2^{-1}+z_1^{-1}z_2^{-2}+z_1+z_2+z_1z_2^{-1}+z_1^{-1}z_2)$$

where the update U is $$U(z_1, z_2) = ½P^{2*}(z_1, z_2) = 1/2^3(1+z_1^{-1}+z_2^{-1}+z_1^{-1}z_2^{-1})^* = 1/2^3(1+z_1+z_2+z_1z_2).$$

A two-channel lifting filter bank of the type shown in FIG. 2 can be converted to an analysis/synthesis filter bank of the form shown in FIG. 1. The actual dual/analysis filters for a filter bank of the form shown in FIG. 1 are given by:

$$\tilde{H}(z_1, z_2) = \tilde{H}_e(z^D) + z^{-t_1}\tilde{H}_o(z^D) = \tilde{H}_e(z_1z_2, z_1/z_2) + z^{-t_1}\tilde{H}_o(z_1z_2, z_1/z_2),$$

$$\tilde{G}(z_1, z_2) = \tilde{G}_e(z_1z_2, z_1/z_2) + z^{-t_1}\tilde{G}_o(z_1z_2, z_1/z_2).$$

Using Equation (11) results in:

$$\tilde{H}(z_1, z_2) = 1 - U(z_1z_2, z_1/z_2)P(z_1z_2, z_1/z_2) + z_1^{-1}U(z_1z_2, z_1/z_2), \tilde{G}(z_1, z_2) = 1 - P(z_1z_2, z_1/z_2).$$

The synthesis/primal filters may be obtained in a similar manner. It can be verified that $$\nabla^n \tilde{G}(z_1, z_2)|_{(0,0)} = 0 \text{ for } 0 \leq n < \tilde{N} = 4 \text{ and } \nabla^n \tilde{G}(z_1, z_2)|_{(0,0)} = 0 \text{ for } 0 \leq n < N = 2.$$

Figure 5A:
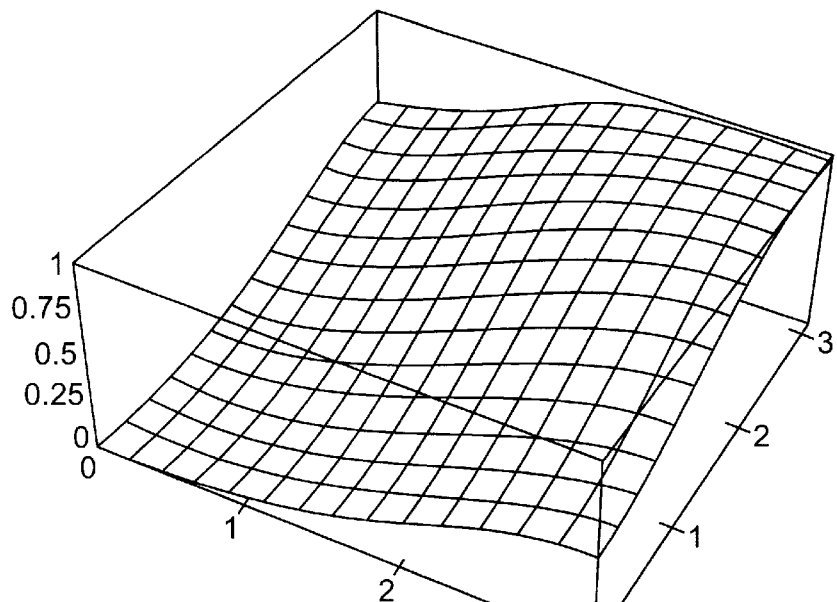
FIGS. 5A and 5B show plots of magnitude Fourier transforms for an exemplary set of analysis/synthesis highpass filters.
Figure 5B:
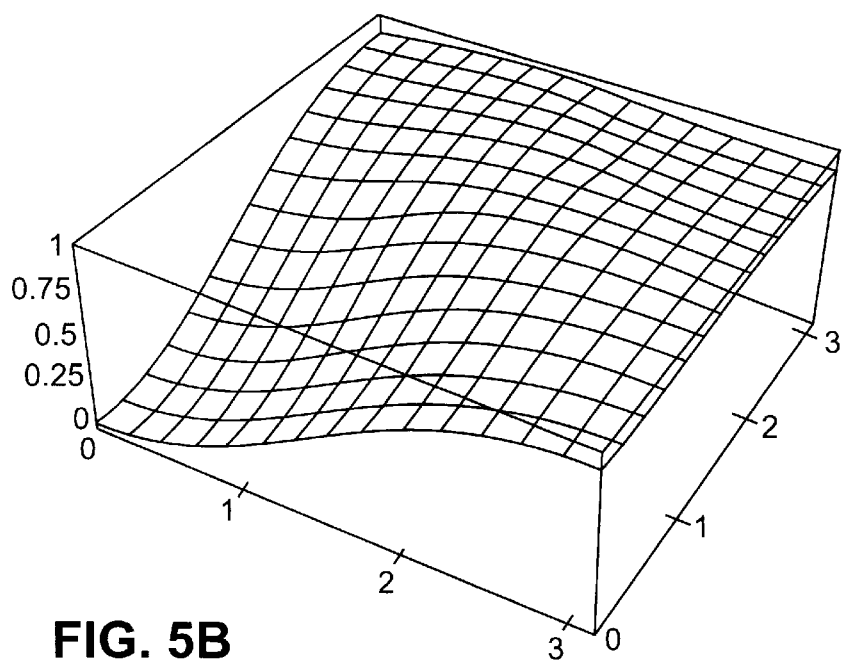

FIGS. 5A and 5B show the magnitudes of the Fourier transforms of the analysis and synthesis filters, respectively, for the above quincunx lattice example.

Figure 6A:
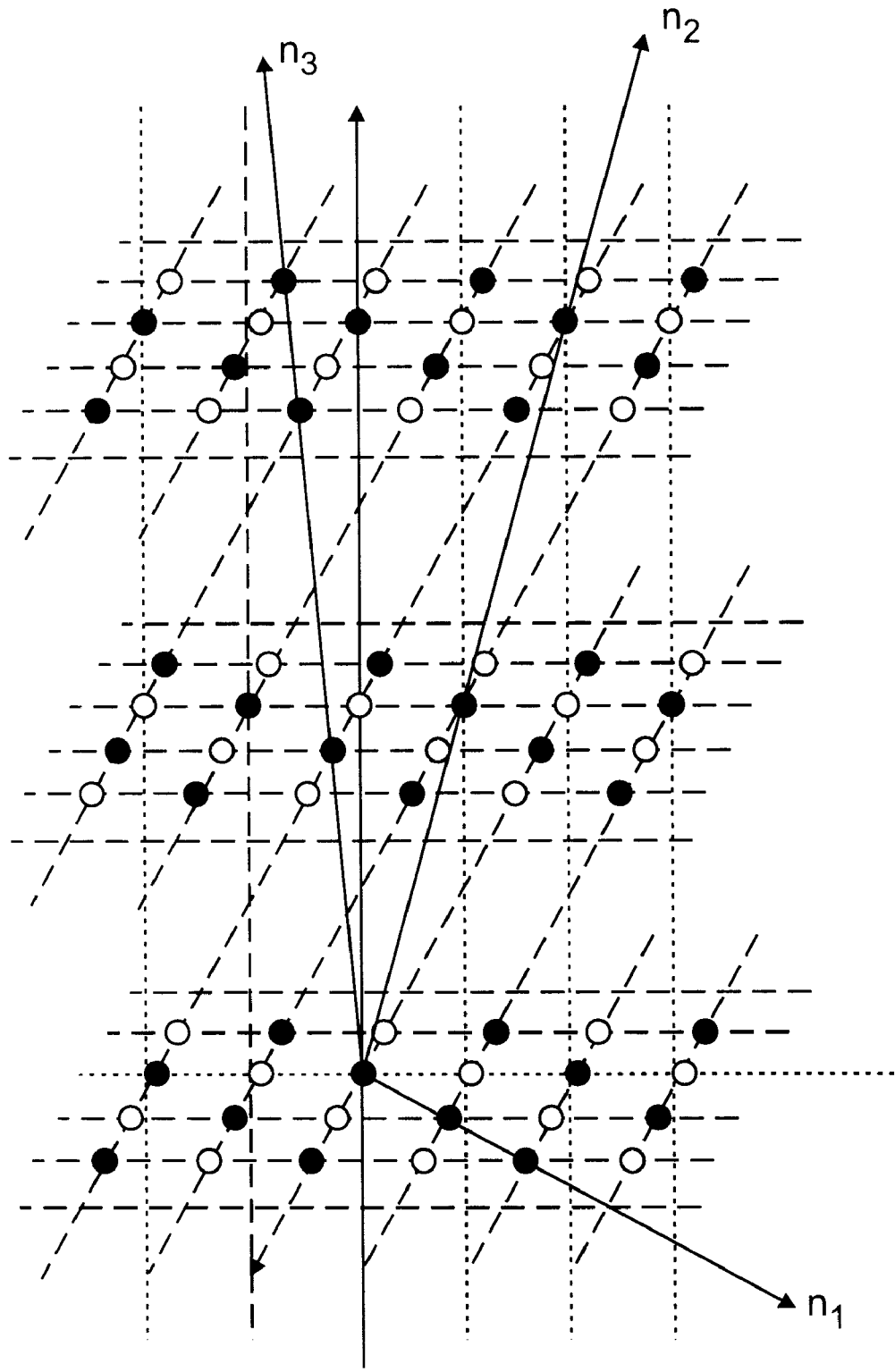
FIGS. 6A and 6B show an FCO lattice with a unit cell, and a sublattice in the sampled domain, respectively.

FIG. 6A shows a signal lattice referred to as the face-centered orthorhombic (FCO) lattice, which has dimension d=3. One of the possible dilation matrices D representing the FCO lattice in a two-channel filter bank is given by:

$$D = \begin{bmatrix} 1 & 0 & 1 \\ 1 & 1 & 0 \\ 0 & 1 & 1 \end{bmatrix}.$$

Figure 6B:
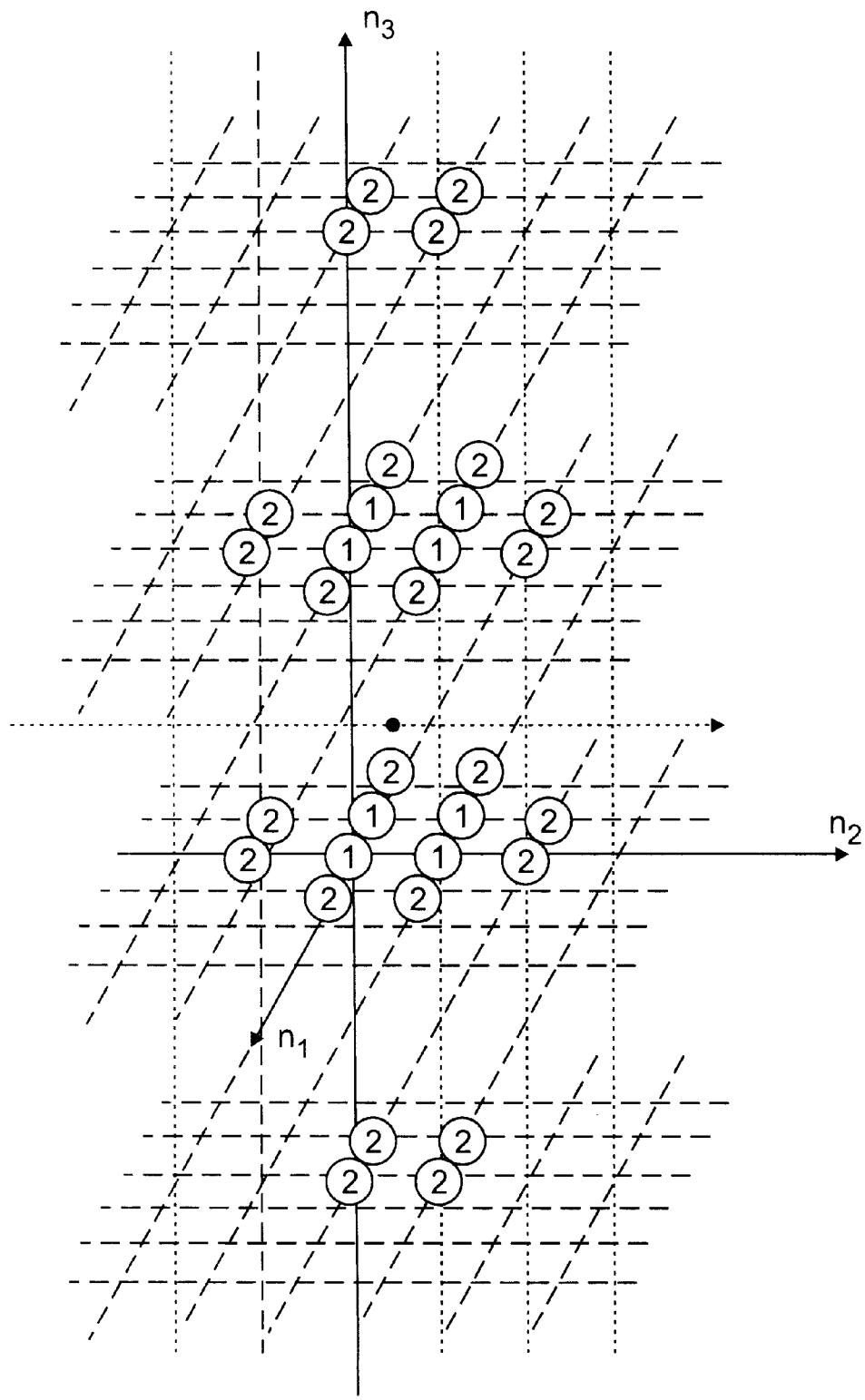

The coset representative in this example is $t_1=(1, 1, 1)$. The shaded region in FIG. 6A corresponds to the unit cell of a sublattice of the FCO lattice. FIG. 6B shows the sublattice of the FCO lattice in the sampled domain, with different neighborhoods of sample points designated by common numbers in the open circles. The small black dot in FIG. 6B is an exemplary point to be interpolated in a filter bank, and corresponds to one of the open circles in FIG. 6A. The shift for the Neville predict filter in a two-channel filter bank for processing the FCO lattice is $\tau = D^{-1}t = (½, ½, ½)$. As in the previous example, a number of different-sized symmetric neighborhoods around $\tau$ are selected, and the above-noted de Boor-Ron algorithm is used to compute the corresponding order and weights for the Neville predict filter. The results of these computations for the FCO lattice are given in TABLE 2 below.

TABLE 2

Neville Filters for the FCO Lattice with d = 2 and M = 2.

| | | Numerator | | |
|---|---|---|---|---|
| | | Neighborhood (No. of Points) | | |
| Taps | Order | 1 (8) | 2 (24) | Denominator |
| 8 | 2 | 1 | | $2^3$ |
| 32 | 4 | 11 | 26 | $2^6$ |

As in TABLE 1, the number in the second row of TABLE 2 identifies a particular neighborhood in FIG. 6B, and the numbers in parentheses after the neighborhood number give the number of points in the corresponding neighborhood.

The above-described quincunx and FCO lattices are special cases of the so-called $D_n$ or checkerboard lattice, described in J. Conway and N. Sloane, "Sphere Packings, Lattices and Groups," Springer-Verlag, 1992. In the general d-dimensional case, the first neighborhood contains $2^d$ points and the second neighborhood contains $d2^d$ points. The corresponding Neville filter weights are given in TABLE 3 below.

TABLE 3

Neville Filters for Checkerboard Lattices in d Dimensions.

| Numerator | | | | |
|---|---|---|---|---|
| | | Neighborhood (No. of Points) | | |
| Taps | Order | 1 ($2^d$) | 2 ($d2^d$) | Denominator |
| $2^d$ | 2 | 1 | | $2^d$ |
| $(d+1)2^d$ | 4 | $8+d$ | $-1$ | $2^{d+3}$ |

As noted above, the invention allows lifting techniques to be applied to M-channel filter banks. In these embodiments, $|D|=M$ and there are M-1 cosets of the form $DZ^d+t_j$ where $t_j \in Z^d$. There are M polyphase components which will be designated using the subscripts 0 to M-1, such that $$H(z) = \sum_{i=0}^{M-1} z^{-t_i} H_i(z^D).$$

Figure 7:
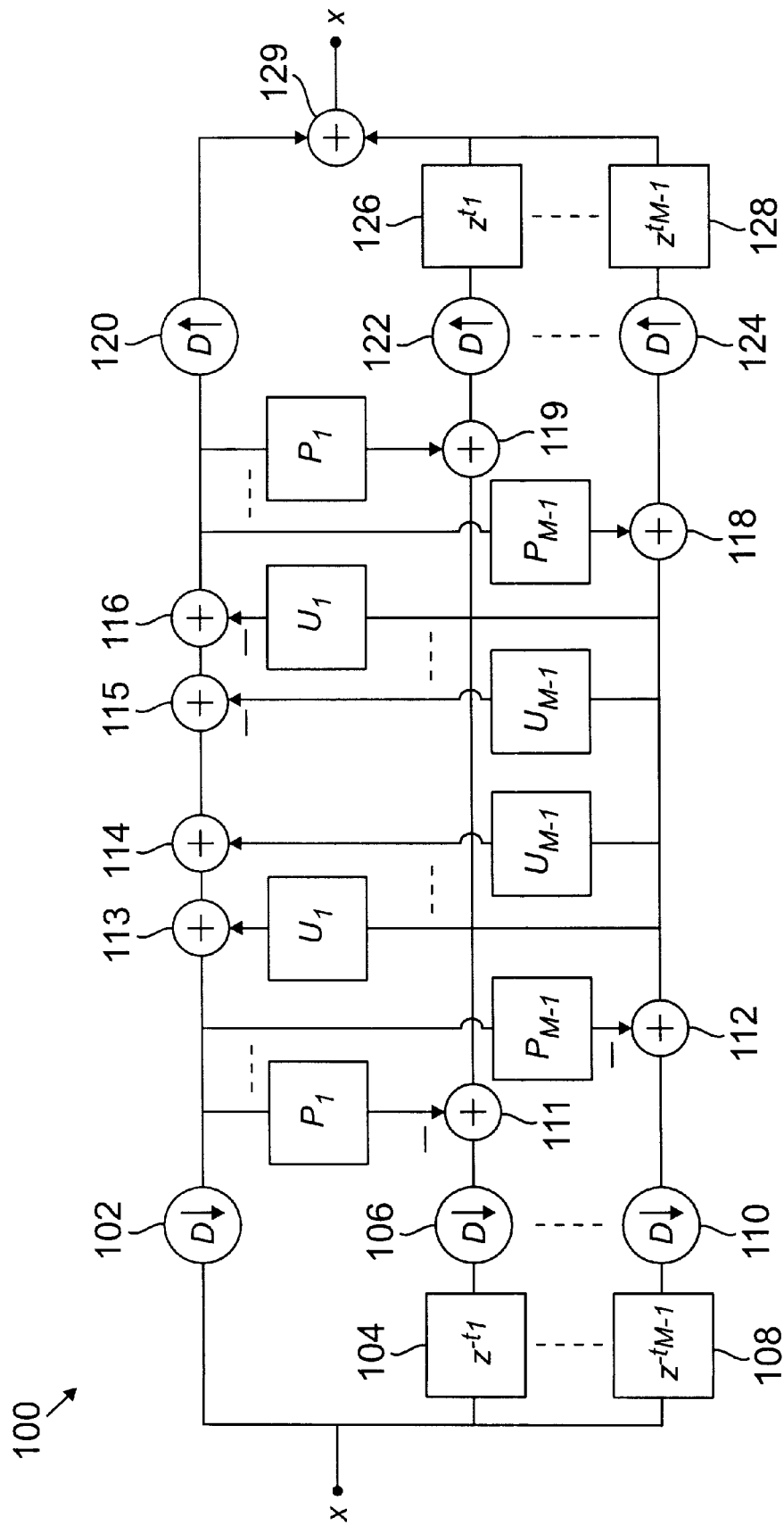
FIG. 7 is a block diagram of an M-channel filter bank using a lifting technique in accordance with the invention.

As in the above description, two lifting operations are used for each of the i channels, $1 \leq i \leq M-1$: a predict operation provided by a predict filter designated $P_i$ and an update operation provided by an update filter designated $U_i$. FIG. 7 shows an M-channel filter bank 100 constructed using these two lifting steps for each channel. An input signal x applied to the filter bank 100 is applied to each of M channels. In the first channel, the signal is downsampled in downsampler 102 and then applied to an input of predict filter $P_1$. The signal is delayed in channel i, $i=2, 3, \ldots M$, as indicated by delay elements 104 and 108, and then downsampled, as indicated by downsamplers 106, 110. Signal combiners 111, 112, 113 and 114 are connected as shown to combine interpolated sample points from the predict filters $P_i$ and the update filters $U_i$, yielding a downsampled and interpolated signal Complementary operations for reconstructing the original input from the downsampled and interpolated signal are provided by signal combiners 115, 116, 118 and 119, upsamplers 120, 122 and 124, delay elements 126 and 128, arranged as shown. The outputs of the each of the M channels are recombined by signal combiner 129 to reconstruct the input signal x.

The polyphase matrix M characterizing the M-channel filter bank 100 of FIG. 7 is an M×M matrix given by:

$$M = \begin{bmatrix} 1 & U_1 & U_2 & \ldots & U_{M-1} \\ 0 & 1 & 0 & \ldots & 0 \\ 0 & 0 & 1 & \ldots & 0 \\ \vdots & \vdots & \vdots & \ddots & \vdots \\ 0 & 0 & 0 & \ldots & 1 \end{bmatrix} \begin{bmatrix} 1 & 0 & 0 & \ldots & 0 \\ -P_1 & 1 & 0 & \ldots & 0 \\ -P_2 & 0 & 1 & \ldots & 0 \\ \vdots & \vdots & \vdots & \ddots & \vdots \\ -P_{M-1} & 0 & 0 & \ldots & 1 \end{bmatrix} \quad (14)$$

$$= \begin{bmatrix} 1 - \sum_{i=1}^{M-1} U_i P_i & U_1 & U_2 & \ldots & U_{M-1} \\ -P_1 & 1 & 0 & \ldots & 0 \\ -P_2 & 0 & 1 & \ldots & 0 \\ \vdots & \vdots & \vdots & \ddots & \vdots \\ -P_{M-1} & 0 & 0 & \ldots & 1 \end{bmatrix} \quad (15)$$

with an adjoint inverse given by:

$$M^{*-1} = \begin{bmatrix} 1 & 0 & 0 & \ldots & 0 \\ -U_1^* & 1 & 0 & \ldots & 0 \\ -U_2^* & 0 & 1 & \ldots & 0 \\ \vdots & \vdots & \vdots & \ddots & \vdots \\ -U_{M-1}^* & 0 & 0 & \ldots & 1 \end{bmatrix} \begin{bmatrix} 1 & P_1^* & P_2^* & \ldots & P_{M-1}^* \\ 0 & 1 & 0 & \ldots & 0 \\ 0 & 0 & 1 & \ldots & 0 \\ \vdots & \vdots & \vdots & \ddots & \vdots \\ 0 & 0 & 0 & \ldots & 1 \end{bmatrix}$$

$$= \begin{bmatrix} 1 & P_1^* & P_2^* & \ldots & P_{M-1}^* \\ -U_1^* & 1-U_1^*P_1^* & -U_1^*P_2^* & \ldots & -U_1^*P_{M-1}^* \\ -U_2^* & -U_2^*P_1^* & 1-U_2^*P_2^* & \ldots & -U_2^*P_{M-1}^* \\ \vdots & \vdots & \vdots & \ddots & \vdots \\ -U_{M-1}^* & -U_{M-1}^*P_1^* & -U_{M-1}^*P_2^* & \ldots & 1-U_{M-1}^*P_{M-1}^* \end{bmatrix}$$

The condition for dual vanishing moments (DM) can now be found, in a manner similar to that used in the above-described two-channel case, as $$\tilde{G}_j \pi(Z^d) = \tilde{G}_j^0 \pi(Z^d) + \sum_{i=1}^{M-1} G_{j,i} \pi(Z^d + t_i) = 0.$$

Substituting values from the jth row of the polyphase matrix M yields:

$$P_j \pi(DZ^d) = \pi(DZ^d + t) \text{ for } \pi \in \pi_N, j=1, \ldots, M-1.$$

This implies that the predict filter $P_j$ is a Neville filter of order N with shift $\tau_j = D^{-1} t_j$. Similarly, the primal moments condition, using the jth row of $M^{*-1}$, becomes $$-U_j^* \pi(DZ^d) - \sum_{i=1}^{M-1} U_j^* P_i^* \pi(DZ^d + t_i) + \pi(DZ^d + t_j) \text{ for } \pi \in \Pi_N.$$

Given that predict filter $P_j$ is a Neville filter of order N with shift $\tau_j$, the above condition, if $N \leq \tilde{N}$, becomes:

$$MU_j^* \pi(DZ^d) = \pi(DZ^d + t_j) \text{ for } \pi \in \pi_N.$$

Consequently, $MU_j^*$ is a Neville filter of order N with shift $\tau_j$. More generally, if $P_j^m$ is a family of Neville filters of order m and shift $D^{-1} t_j$, and if $N \leq \tilde{N}$, a filter bank with N primal vanishing moments and $\tilde{N}$ dual vanishing moments can be constructed by letting the predict filters be $P_j^N$ and choosing the update filters $U_j$ as $P_j^{\tilde{N}}/M$. The same remarks from the two-channel case above regarding the choice of U and the $N \leq \tilde{N}$ restriction are also applicable to the M-channel case.

A number of examples will now be provided to illustrate M-channel filter banks in accordance with the invention, where M>2. In a one-dimensional, M-channel embodiment, the coset representatives are $t_i = i$, $0 \leq i < M$, and the corresponding shifts are $\tau_i = i/M$. Thus $P_i$ is a Neville filter with shift i/M. Given that $\tau_i = 1 - \tau_{M-i}$, the predict filter $P_i(z) = z \, P_{M-i}(1/z)$. TABLES 4 and 5 below give the predict filters $P_i$ for three-channel and four-channel filter banks in the one-dimensional case. TABLE 4 shows the predict filters $P_1$, while $P_2(z) = z \, P_1(1/z)$. TABLE 5 gives the predict filters $P_1$, while $P_2$ corresponds to Deslauriers-Dubuc predict filters, and $P_3(Z) = z \, P_1(1/z)$.

TABLE 4

Neville Filters for d = 1 and M = 3.

| | Numerator | | | | | | | | |
|---|---|---|---|---|---|---|---|---|---|
| N/k | 3 | 2 | 1 | 0 | -1 | -2 | -3 | -4 | Denominator |
| 2 | | | | 2 | 1 | | | | 3 |
| 4 | | | -5 | 60 | 30 | -4 | | | $3^3$ |
| 6 | | 8 | -70 | 560 | 280 | -56 | 7 | | $3^6$ |
| 8 | -44 | 440 | -2310 | 15400 | 7700 | -1848 | 385 | -40 | $3^9$ |

TABLE 5

Neville Filters for d = 1 and M = 4.

| | Numerator | | | | | | | | |
|---|---|---|---|---|---|---|---|---|---|
| N/k | 3 | 2 | 1 | 0 | -1 | -2 | -3 | -4 | Denominator |
| 2 | | | | 3 | 1 | | | | 3 |
| 4 | | | -7 | 105 | 35 | -5 | | | $3^3$ |
| 6 | | 77 | -693 | 6930 | 2310 | -495 | 63 | | $3^6$ |
| 8 | -495 | 5005 | -27027 | 225225 | 75075 | -19305 | 4095 | -429 | $3^9$ |

Figure 8A:
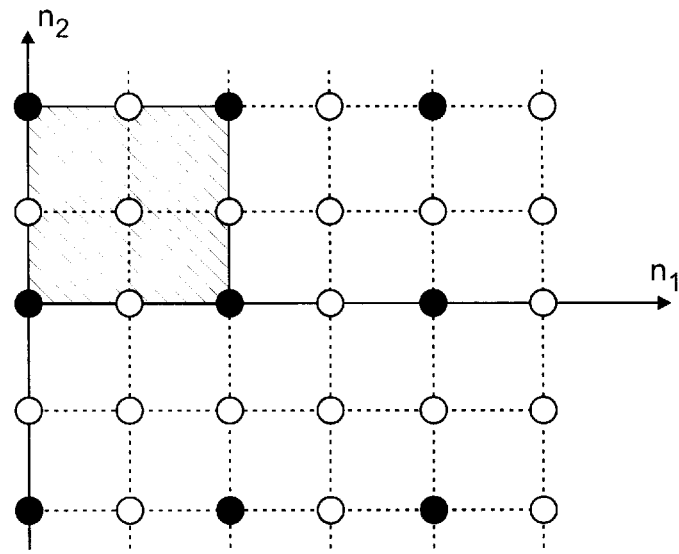
FIGS. 8A and 8B show a separable lattice with a unit cell, and three sublattices of the separable lattice in the sampled domain, respectively.
Figure 8B:
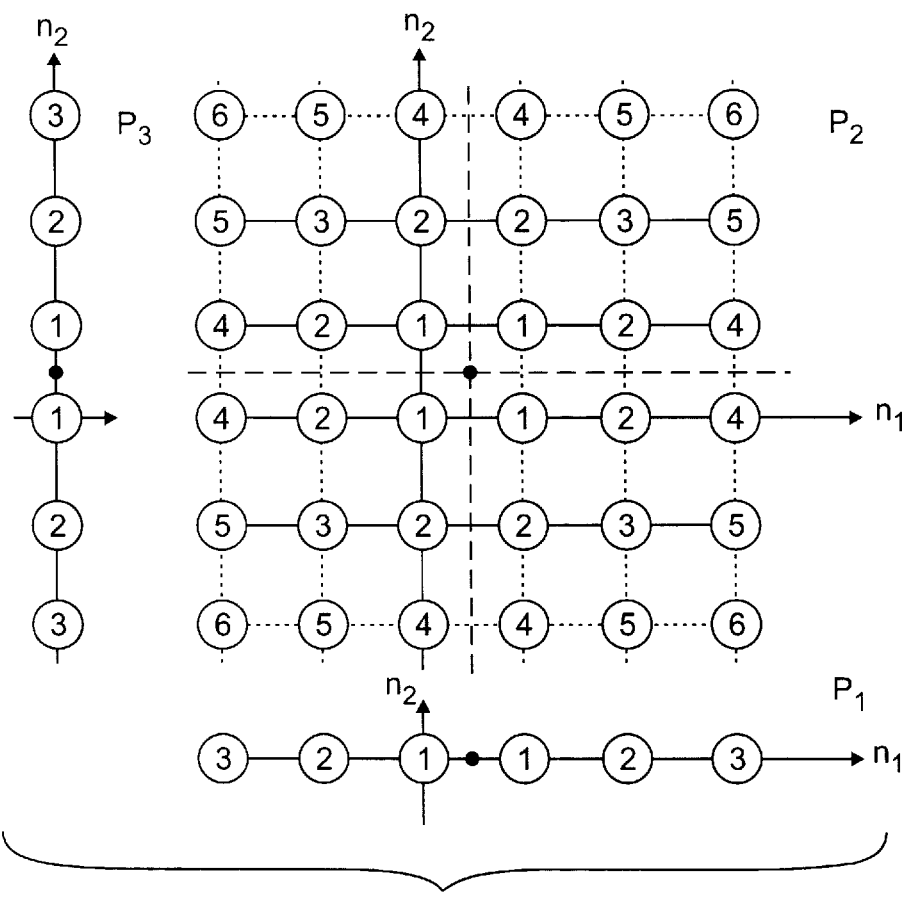

FIG. 8A shows a two-dimensional separable lattice, and FIG. 8B shows the corresponding sublattices in the sampled domain with interpolation neighborhoods for a filter bank in which M=4. The unit cell for a sublattice of the two-dimensional separable lattice is the shaded area in FIG. 8A. The dilation matrix D in this case is a diagonal matrix given by:

$$D = \begin{bmatrix} 2 & 0 \\ 0 & 2 \end{bmatrix}.$$

The coset representatives taken from the unit cell are:

$t_0=(0, 0)$, $t_1=(1, 0)$, $t_2=(0, 1)$, $t_3=(1, 1)$, with the corresponding shifts $\tau_i$ given by:

$\tau_1=(\frac{1}{2}, 0)$, $\tau_2=(0, \frac{1}{2})$, $\tau_3=(\frac{1}{2}, \frac{1}{2})$, It should be noted that for the predict filters $P_1$ and $P_3$ the neighborhoods in the sampled domain, as shown in FIG. 8B, are one dimensional and thus $P_1$ and $P_3$ may be selected as the above-noted Deslauriers-Dubuc filters. Moreover, the neighborhoods for predict filter $P_2$ are the same as those in the quincunx lattice described above in conjunction with FIGS. 4A and 4B. The two-dimensional M-channel case can thus lead to separable predict filters, although it is also possible to have nonseparable filters in this case. It should be noted that in the two-dimensional M-channel case, all predict filters are separable even if they produce nonseparable filters. This is a significant advantage of the invention in that it simplifies implementation.

Figure 9A:
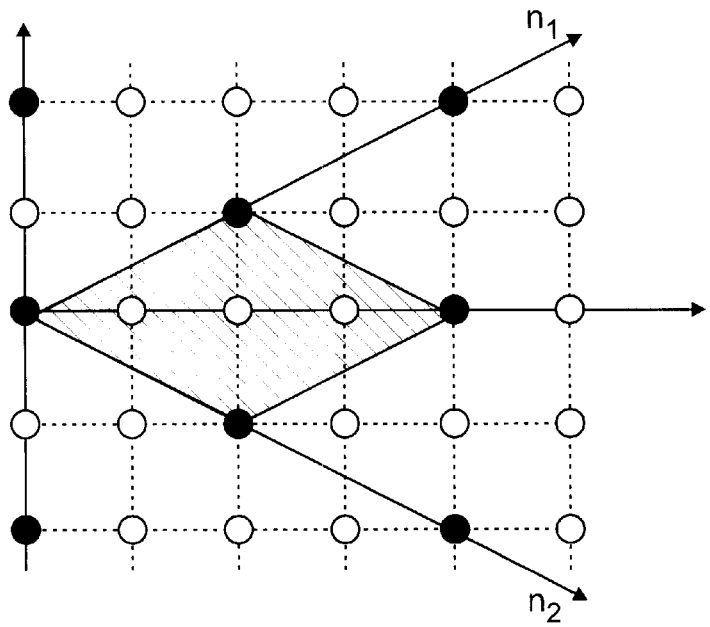
FIGS. 9A and 9B show a hexagonal lattice with a unit cell, and a corresponding sublattice in the sampled domain, respectively.
Figure 9B:
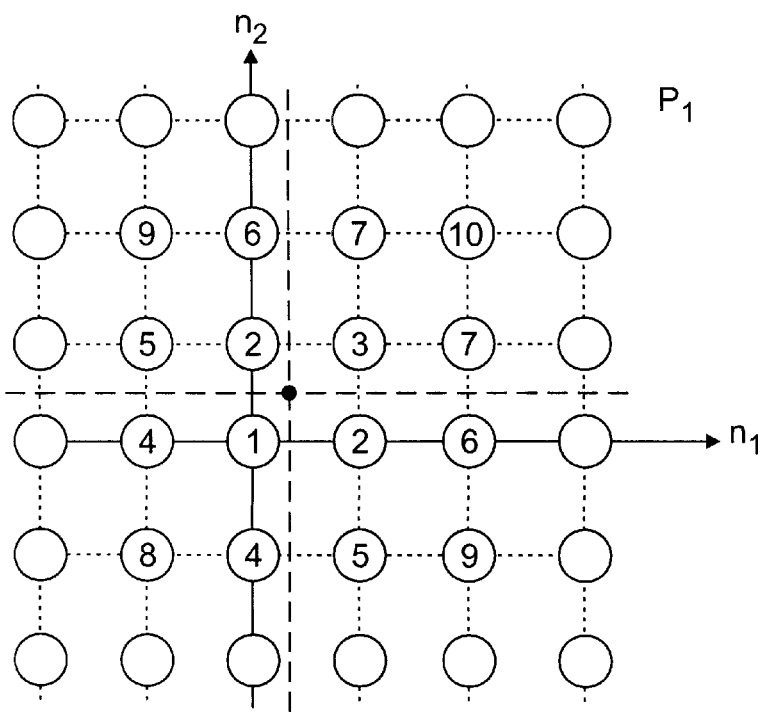

Another example of a filter bank with M=4 channels for processing a signal in the form of a lattice of dimension d=2 will be described in conjunction with FIGS. 9A and 9B. FIG. 9A shows a hexagonal lattice, with the shaded area representing a unit cell of a corresponding sublattice, and FIG. 9B shows the sublattice in the sampled domain with a number of neighborhoods. FIG. 9B shows only the sublattice and neighborhoods for the predict filter $P_1$. The predict filter $P_2$ has the same sampled domain sublattice and neighborhoods as in the quincunx case shown in FIG. 4B, while the predict filter $P_3$ has the same neighborhoods as $P_1$ except time reversed in both dimensions. The small black dot within the first ring of the sampled domain sublattice of FIG. 9B is the point $(\frac{1}{4}, \frac{1}{4})$ to be interpolated by the predict filter $P_1$. In this example, one possible dilation matrix D is given by:

$$D = \begin{bmatrix} 2 & 2 \\ 1 & -1 \end{bmatrix}.$$

The coset representatives taken from the unit cell of FIG. 9A are $t_i=(i, 0)$, for $i=1, 2$ and 3. In accordance with the above general description of the M-channel filter banks, the shift for the Neville filter family is $\tau_i=D^{-1} t_i=(i/4, i/4)$, for $i=1, 2$ and 3. TABLE 6 below gives the filter weights for predict filter $P_1$ for the two-dimensional hexagonal lattice case. The predict filter $P_2$ is the same as that in the quincunx case of FIG. 4B, and as previously noted $P_3$ corresponds to $P_1$ time reversed in both directions, or in other words, $P_3(Z)=z_1 P_1(1/z)$. TABLE 6 gives the $P_1$ filter weights for interpolation orders 1, 2, 4 and 6, as generated using the above-noted de Boor-Ron algorithm.

TABLE 6

Neville Filters for the Hexagonal Lattice with d = 2 and M = 4.

| | | Numerator | | | | | | | | | |
|---|---|---|---|---|---|---|---|---|---|---|---|
| | | Neighborhood (Number of Points) | | | | | | | | | |
| Taps | Order | 1 (1) | 2 (2) | 3 (1) | 4 (2) | 5 (2) | 6 (2) | 7 (2) | 8 (1) | 9 (2) | 10 (1) | Denom. |
| 1 | 2 | 1 | | | | | | | | | | |
| 4 | 4 | 9 | 3 | 1 | | | | | | | | $2^4$ |
| 12 | 6 | 342 | 114 | 38 | −21 | −7 | −15 | −5 | | | | $2^9$ |
| 16 | 8 | 11025 | 3675 | 1225 | −735 | −245 | −525 | −175 | 49 | 35 | 25 | $2^{14}$ |

Figure 10B:
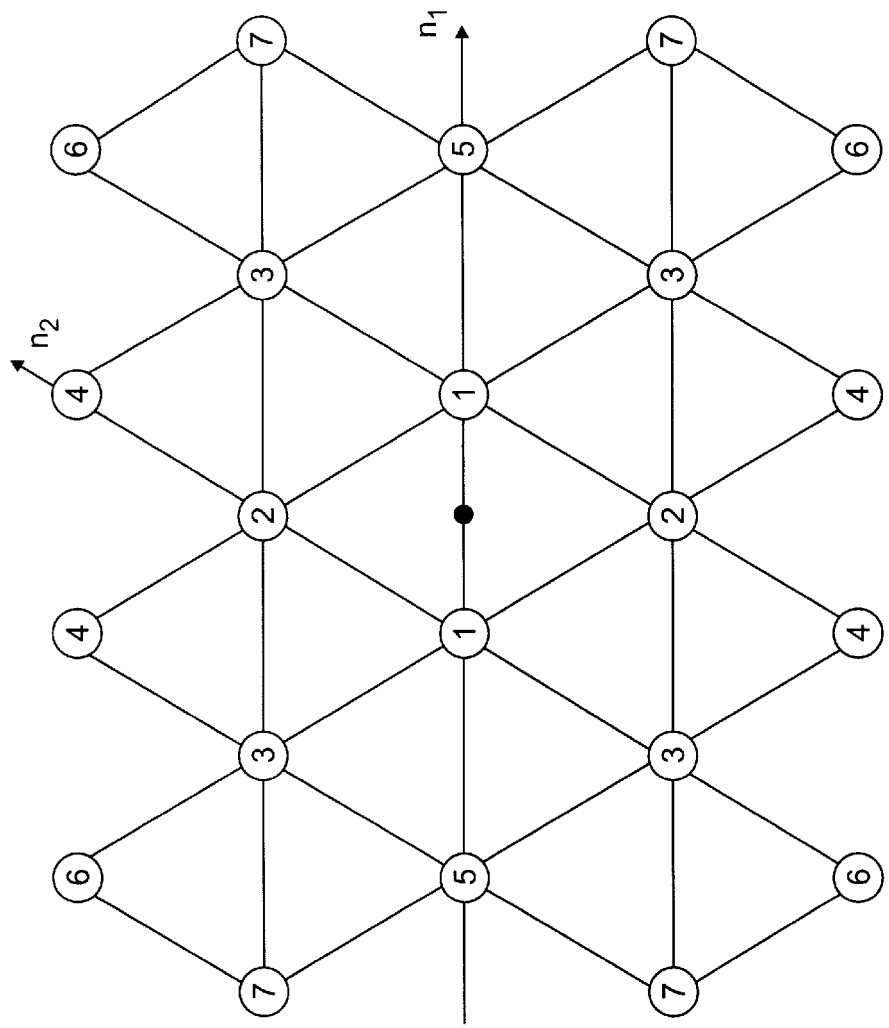
FIGS. 10A and 10B show a triangular edge lattice with a unit cell, and a corresponding sublattice in the sampled domain, respectively.
Figure 10A:
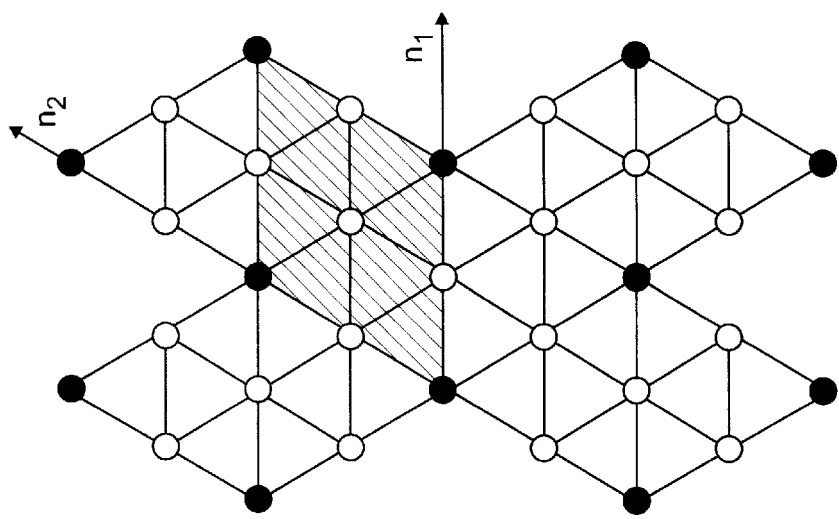
Figure 10C:
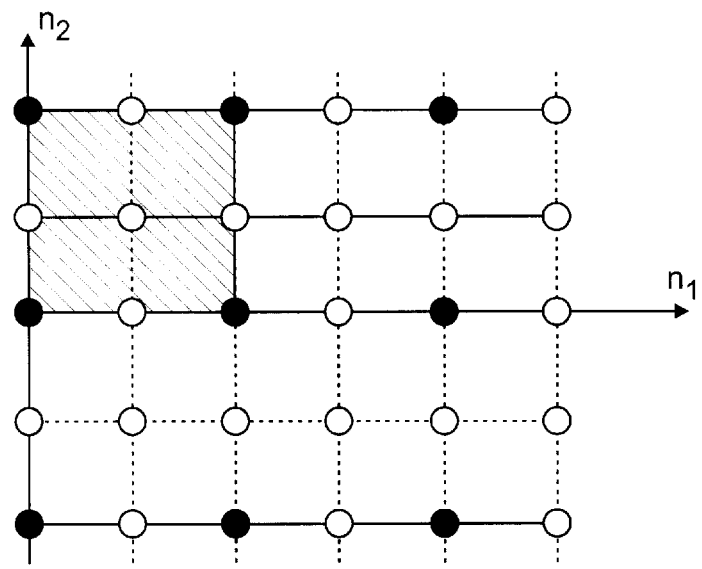
FIG. 10C shows the lattice and unit cell of FIG. 10A in a square coordinate system.

Another example of a filter bank with M=4 channels for processing a signal in the form of a lattice of dimension d=2 will be described in conjunction with FIGS. 10A, 10B and 10C. FIG. 10A shows a triangular edge lattice, with the shaded area representing a unit cell of a corresponding sublattice, and FIG. 10B shows the sublattice for predict filter $P_1$ in the sampled domain with a number of different neighborhoods. FIG. 10C shows the triangular edge lattice of FIG. 10A in a square coordinate system. It can be seen that the triangular edge lattice in the square coordinate system corresponds to the separable lattice of FIG. 8A. The small black dot within the first ring of the sampled domain sublattice of FIG. 10B is the point (½, 0) to be interpolated by the predict filter $P_1$. In this example, one possible dilation matrix D is given by twice the identity matrix I or:

$$D = \begin{bmatrix} 2 & 0 \\ 0 & 2 \end{bmatrix}.$$

As in the case of the separable lattice of FIG. 8A, the coset representatives taken from the unit cell are $t_0=(0, 0)$, $t_1=(1, 0)$, $t_2=(0, 1)$ and $t_3=(1, 1)$, and the corresponding shifts for the Neville filter family are $\tau_1=(½, 0)$, $\tau_2=(0, ½)$ and $\tau_3=(½, ½)$. However, the fact that the original lattice of FIG. 10A is organized in equilateral triangles leads to a different choice of neighborhoods which reflects the three symmetry axes of the lattice. TABLE 7 below gives the filter weights for predict filter $P_1$ for a four-channel filter bank in the two-dimensional triangular edge lattice case. TABLE 7 gives the $P_1$ filter weights for interpolation orders 2, 4 and 6, as generated using the above-noted de Boor-Ron algorithm.

Figure 11A:
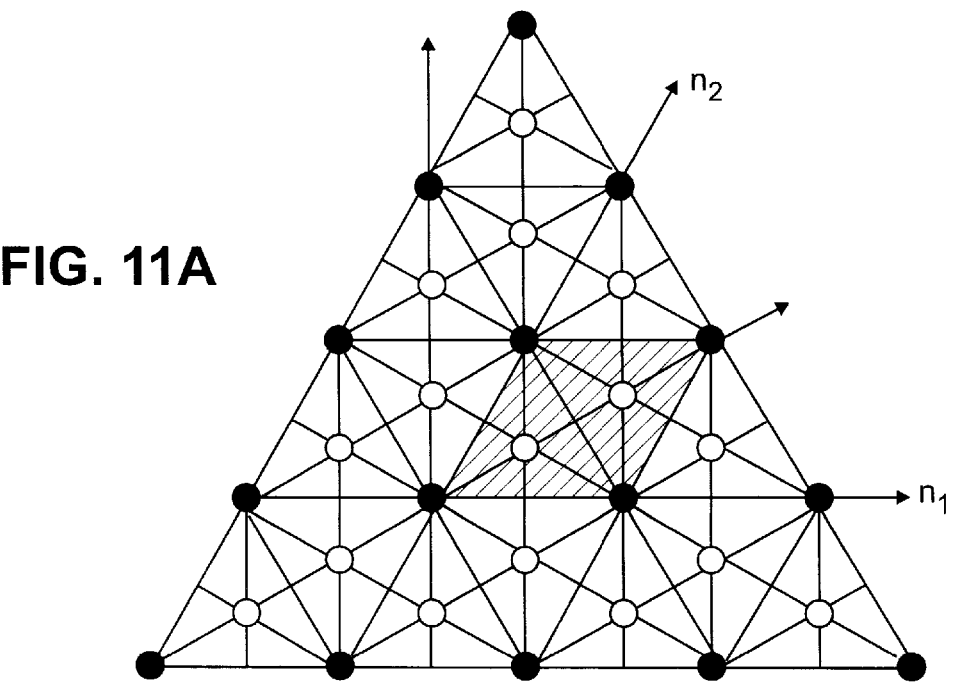
FIGS. 11A and 11B show a triangular face lattice with a unit cell, and a corresponding sublattice in the sampled domain, respectively.
Figure 11B:
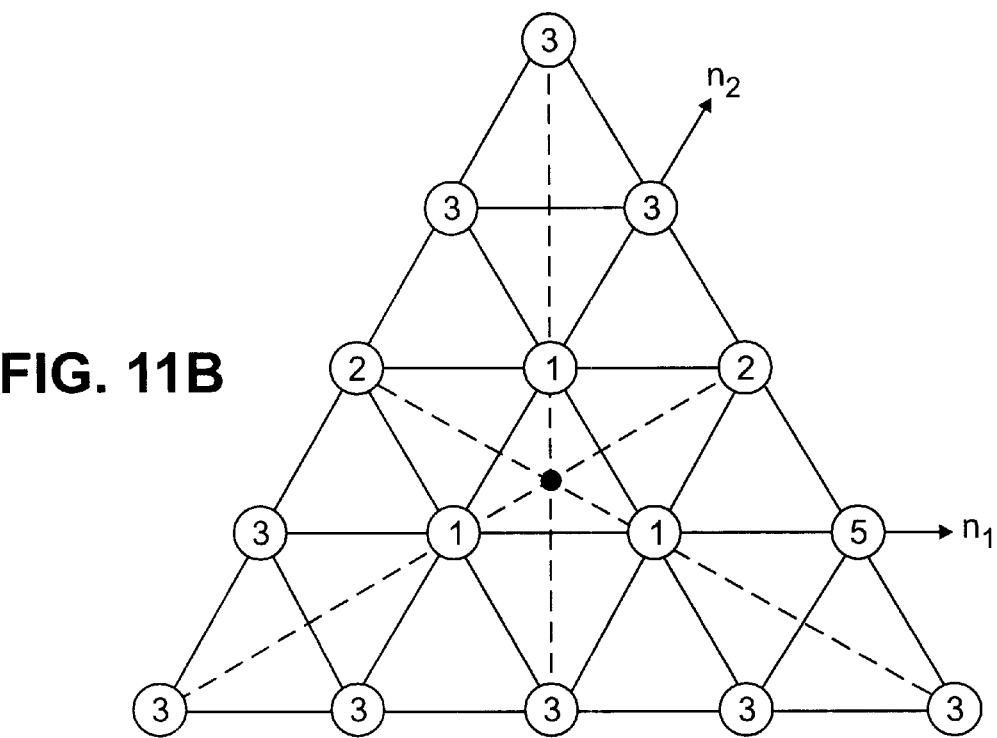
Figure 11C:
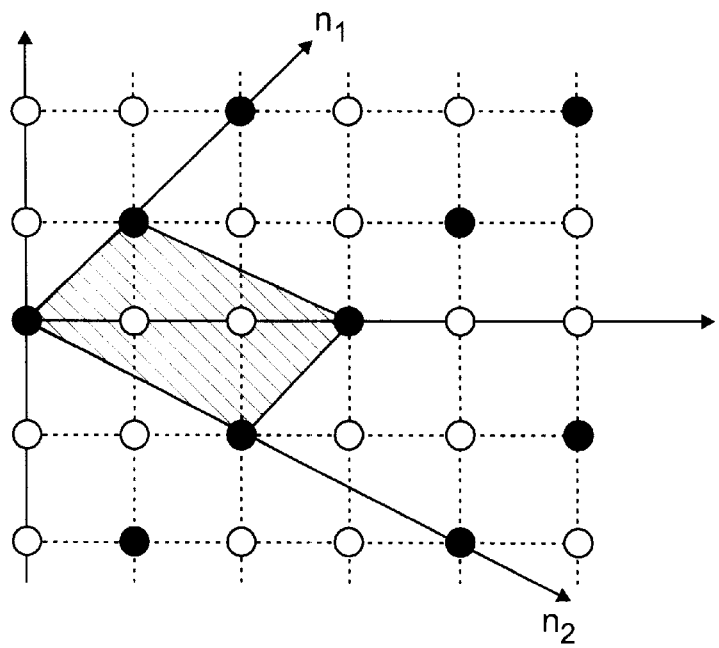
FIG. 11C shows the lattice and unit cell of FIG. 11A in a square coordinate system.

An example of a filter bank with M=3 channels for processing a signal in the form of a lattice of dimension d=2 will be described in conjunction with FIGS. 11 A, 11B and 11C. FIG. 11A shows a triangular face lattice, with the shaded area representing a unit cell of a corresponding sublattice, and FIG. 11B shows the sublattice for the predict filters $P_1$ and $P_2$ in the sampled domain with a number of neighborhoods. The small black dot within the first ring of the sampled domain sublattice of FIG. 11B is the point (⅓, ⅓) to be interpolated by the predict filters $P_1$ and $P_2$. In this example, one possible dilation matrix D is given by:

$$D = \begin{bmatrix} 2 & 1 \\ -1 & 1 \end{bmatrix}.$$

The coset representatives taken from the unit cell of FIG. 11A are $t_i=(i, 0)$, for i=1, 2. In accordance with the above general description of the M-channel filter banks, the shifts for the Neville filter family are $\tau_i=D^{-1} t_i=(i/3, i/3)$, for i=1, 2. TABLE 8 below gives the filter weights for the predict filter $P_1$ in the three-channel filter bank for processing the two-dimensional triangular face lattice. The predict filter $P_2$ is the same as the predict filter $P_1$. TABLE 8 gives the $P_1$ filter weights for interpolation orders 2, 3 and 5, as generated using the above-noted de Boor-Ron algorithm.

TABLE 7

Neville Filters for the Triangular Edge Lattice with d = 2 and M = 4.

| | | Numerator | | | | | | | |
|---|---|---|---|---|---|---|---|---|---|
| | | Neighborhood (Number of Points) | | | | | | | |
| Taps | Order | 1 (2) | 2 (2) | 3 (4) | 4 (4) | 5 (2) | 6 (4) | 7 (4) | Denominator |
| 2 | 2 | 1 | | | | | | | $2^4$ |
| 8 | 4 | 8 | 2 | −1 | | | | | $2^4$ |
| 22 | 6 | 558 | 102 | −60 | −23 | −6 | 9 | 3 | $2^{10}$ |

TABLE 8

Neville Filters for the Triangular Face Lattice
with d = 2 and M = 3.

Numerator

| | | Neighborhood (No. of Points) | | | | |
|---|---|---|---|---|---|---|
| Taps | Order | 1 (3) | 2 (3) | 3 (6) | 4 (3) | Denominator |
| 3 | 2 | 1 | | | | $3^1$ |
| 6 | 3 | 4 | −1 | | | $3^2$ |
| 15 | 5 | 96 | 12 | −16 | 5 | $3^5$ |

An implementation of a filter bank in accordance with the invention will now be described in greater detail. The input signal is a sequence $x = \{x_k \mid k \in K\}$ and the filter bank generates M output sequences: one low pass sequence $s = \{s_k \mid k \in K\}$, and M-1 high pass sequences $d_i = \{d_{i;k} \mid k \in K\}$. Each sample of the output sequences can be identified with a unique sample of the input sequence: the $s_k$ correspond to $x_{Dk}$ and the $d_{i;k}$ correspond to $x_{Dk+ti}$. This correspondence combined with the above-described lifting steps allows for an in-place computation: instead of allocating new memory for the s and $d_i$ sequences, it is possible to simply overwrite the corresponding elements in the x sequence. Lifting guarantees that a sample which is needed later will not be overwritten. It will be assumed that the impulse responses of the predict filter $P_i$ and the update filter $U_i$ are given by $P_{i;k}$ and $u_{i;k}$, respectively. The predict and update sequences are non-zero in a finite symmetric neighborhood around the origin N: $p_{i;k} \neq 0$ for $k \in N \subset K$. The filter bank can now be described by the following analysis and synthesis pseudocode:

Analysis for $1 \le i \le M - 1$:

for $k \in K$:

$$x_{Dk+ti} \mathrel{-}= \sum_{l \in N+k} p_{i;k-l} x_{Dl}$$

for $1 \le i \le M - 1$:

for $k \in K$:

$$x_{Dk} \mathrel{+}= \sum_{l \in N+k} u_{i;k-l} x_{Dl+ti}$$

Synthesis for $1 \le i \le M - 1$:

for $k \in K$:

$$x_{Dk} \mathrel{-}= \sum_{l \in N+k} u_{i;k-l} x_{Dl+ti}$$

for $1 \le i \le M - 1$:

for $k \in K$:

$$x_{Dk+ti} \mathrel{+}= \sum_{l \in N+k} p_{i;k-l} x_{Dl}$$

The operators "−=" and "+=" are to be interpreted in accordance with their meaning in the C programming language. The above pseudocode illustrates one of the advantages of lifting: once the algorithm for the analysis is coded, the synthesis algorithm immediately follows by reversing the operations and flipping the signs.

In order to illustrate how much the lifting process can speed up the operation of a filter bank, consider the polyphase matrix used above to characterize the filter bank 100 of FIG. 7. To estimate the cost of implementing the polyphase matrix in the lifting framework of the present invention compared to a conventional implementation, assume that the computational cost of each predict and update filter is the same and equal to C. The computational cost of a lifting implementation, which corresponds to Equation (14) above describing of the polyphase matrix of filter bank 100, is then 2(M-1)C. The cost of the standard implementation, which corresponds to Equation (15) above, is the cost of the lifting implementation plus the cost associated with the top left element in the matrix of Equation (15):

$$1 - \sum_{i=1}^{M-1} U_i P_i$$

If the above formula is used to implement a filter corresponding to this element, the cost is about 2(M -1 )C. An alternative is to expand the expression of the element, and then apply a corresponding expanded filter. Assuming that the neighborhoods of the predict and update operators are given roughly by balls in d dimensions, the cost of the expanded filter will be $2^d C$. For applications with low dimensions and a high number of subbands, this alternative implementation may be less costly. Combining the above, it can be seen that the speed-up factor provided by lifting is roughly equivalent to:

$$1 + \min\left(1, \frac{2^{d-1}}{M-1}\right)$$

If $2^{d-1} > M-1$, that is, in cases in which there are either high dimensions or a low number of subbands, the speed-up factor is two. Otherwise, it is lower than two. For low dimensions with a high number of sidebands, the factor becomes insignificant. Separable lattices, where $M = 2^d$, represent an intermediate case in which the speed-up factor is about 1.5.

The above-described embodiments of the invention are intended to be illustrative only. Numerous alternative embodiments within the scope of the following claims will be apparent to those skilled in the art.

What is claimed is:

1. A method of filtering an input signal in a filter bank, the method comprising the steps of:

downsampling the input signal in each of M channels of the filter bank, where M is greater than two; and processing downsampled versions of the input signal in at least a first predict filter and at least one update filter, wherein the first predict filter and the update filter are associated with a pair of the M channels of the filter bank, and the update filter is selected as the adjoint of a predict filter having an order less than or equal to that of the first predict filter, divided by M.

2. The method of claim 1 wherein the update filter is selected as the adjoint of the first predict filter divided by M.

3. The method of claim 1 wherein the processing step further includes processing downsampled versions of the input signal in a set of M-1 predict filters and a corresponding set of M-1 update filters, wherein each of the predict and update filters are associated with a pair of the M channels of the filter bank, and at least a subset of the update filters are each selected as the adjoint of the corresponding predict filter divided by M.

4. The method of claim 3 further including the step of delaying the input signal in each of the last M-1 of the M channels, such that a delay of $t_i$ is applied to the signal in the ith channel, for i=2, . . . M-1, prior to downsampling the signal in that channel.

5. The method of claim 3 wherein the M-1 predict filters provide shifts $\tau_i$ which are generated as $\tau_i = D^{-1} t_i$, i=1, 2, . . . M-1, where D is a dilation matrix having a determinant equal to M, and the $t_i$ are coset representatives taken from a unit cell of a lattice representation of the signal.

6. The method of claim 3 further including the steps of:
processing interpolated downsampled versions of the input signal in a second set of M-1 predict filters and a corresponding second set of M-1 update filters, wherein each of the predict and update filters in the second sets are associated with a pair of the M channels of the filter bank;
upsampling portions of the signal in each of the M channels of the filter bank, after processing in the second sets of predict and update filters; and
recombining outputs of the M channels of the filter bank to generate an output signal having substantially the same resolution as the input signal.

7. The method of claim 1 wherein the input signal is in the form of a lattice of sample points.

8. The method of claim 7 wherein the input signal is in the form of a lattice of sample points having dimension d greater than or equal to one.

9. A filter bank for filtering an input signal, comprising:
a downsampler for downsampling the input signal in each of M channels of the filter bank, where M is greater than two; and
at least a first predict filter and at least one update filter, for processing resulting downsampled versions of the input signal, wherein the first predict filter and the update filter are associated with a pair of the M channels of the filter bank, and the update filter is selected as the adjoint of a predict filter having an order less than or equal to that of the first predict filter, divided by M.

10. The filter bank of claim 9 wherein the update filter is selected as the adjoint of the first predict filter divided by M.

11. The filter bank of claim 9 wherein the at least one predict filter is part of a set of M-1 predict filters and the at least one update filter is part of a corresponding set of M-1 update filters for processing resulting downsampled versions of the input signal, wherein each of the predict and update filters are associated with a pair of the M channels of the filter bank, and at least a subset of the update filters are each selected as the adjoint of the corresponding predict filter divided by M.

12. The filter bank of claim 11 further including a plurality of delay elements for delaying the input signal in each of the last M-1 of the M channels, such that a delay of $t_i$ is applied to the signal in the ith channel, for i=2, . . . M-1, prior to downsampling the signal in that channel.

13. The filter bank of claim 11 wherein the M-1 predict filters provide shifts $\tau_i$ which are generated as $\tau_i = D^{-1} t_i$, i=1, 2, . . . M1, where D is a dilation matrix having a determinant equal to M, and the $t_i$ are coset representatives taken from a unit cell of a lattice representation of the signal.

14. The filter bank of claim 11 further including:
a second set of M-1 predict filters and a corresponding second set of M-1 update filters, for processing interpolated downsampled versions of the input signal, wherein each of the predict and update filters in the second sets are associated with a pair of the M channels of the filter bank; and
an upsampler in each of the M channels for upsampling portions of the signal in each of the M channels, after processing in the second sets of predict and update filters; and
a signal combiner for recombining outputs of the M channels of the filter bank to generate an output signal having substantially the same resolution as the input signal.

15. The filter bank of claim 9 wherein the input signal is in the form of a lattice of sample points.

16. The filter bank of claim 15 wherein the input signal is in the form of a lattice of sample points having dimension d greater than or equal to one.

* * * * *